US 6,630,262 B2

(12) United States Patent
Yang et al.

(10) Patent No.: US 6,630,262 B2
(45) Date of Patent: Oct. 7, 2003

(54) METAL-GAS CELL BATTERY WITH SOFT POCKET

(76) Inventors: De-Qian Yang, 23624 Alada Dr., Diamond Bar, CA (US) 91765; Yu-Qiang Yang, 23624 Alada Dr., Diamond Bar, CA (US) 91765

(*) Notice: Subject to any disclaimer, the term of this patent is extended or adjusted under 35 U.S.C. 154(b) by 58 days.

(21) Appl. No.: 09/683,120

(22) Filed: Nov. 20, 2001

(65) Prior Publication Data

US 2002/0132150 A1 Sep. 19, 2002

Related U.S. Application Data

(63) Continuation-in-part of application No. 09/682,012, filed on Jul. 9, 2001, now abandoned, which is a continuation-in-part of application No. 09/681,260, filed on Mar. 9, 2001, now abandoned.

(51) Int. Cl.[7] .................. H01M 2/08; H01M 2/10; H01M 2/18; H01M 10/42
(52) U.S. Cl. .................. 429/28; 429/27; 429/35; 429/136; 429/139; 429/229; 429/208
(58) Field of Search .................. 429/28, 34, 36, 429/35, 136, 139, 131, 229, 208, 27

(56) References Cited

U.S. PATENT DOCUMENTS

| | | |
|---|---|---|
| 3,513,030 A | 5/1970 | Rosansky et al. |
| 3,981,747 A | 9/1976 | Doniat et al. |
| 4,389,466 A | 6/1983 | Joy |
| 4,560,626 A | 12/1985 | Joy |
| 4,756,980 A | 7/1988 | Niksa et al. |
| 4,842,963 A | 6/1989 | Ross, Jr. |
| 4,950,561 A | 8/1990 | Niksa et al. |
| 5,006,424 A | 4/1991 | Evans et al. |
| 5,203,526 A | 4/1993 | Green et al. |
| 5,208,526 A | 5/1993 | Goldman et al. |
| 5,286,578 A | 2/1994 | Rao et al. |
| 5,318,861 A | 6/1994 | Harats et al. |
| 5,366,822 A | 11/1994 | Korall et al. |
| 5,415,949 A | 5/1995 | Stone et al. |
| 5,418,080 A | 5/1995 | Korall et al. |
| 5,434,020 A | 7/1995 | Cooper |
| 5,447,805 A | 9/1995 | Harats et al. |
| 5,558,947 A | 9/1996 | Robison |
| 5,616,434 A * | 4/1997 | Redden et al. .............. 429/136 |
| 5,650,241 A | 7/1997 | McGee |
| 5,753,384 A | 5/1998 | Kimberg |
| 5,904,999 A | 5/1999 | Kimberg et al. |
| 6,057,053 A | 5/2000 | Gibb |

* cited by examiner

*Primary Examiner*—Patrick Ryan
*Assistant Examiner*—Tracy Dove

(57) ABSTRACT

A metal-gas cell storage battery, such as a zinc-air cell battery, has one or more battery cells wherein each battery cell comprises a metallic anode sandwiched between a pair of gas cathodes. Each gas cathode is disposed within a rigid retaining structure. The retaining structures of each gas cathode are attached to one another by an expandable soft pocket capable of holding an electrolyte. The anode is disposed within the soft pocket. The cell is mechanically refueled by expanding the soft pocket to allow easy removal from the cell of the spent anode and easy insertion into the cell of a fresh anode.

47 Claims, 22 Drawing Sheets

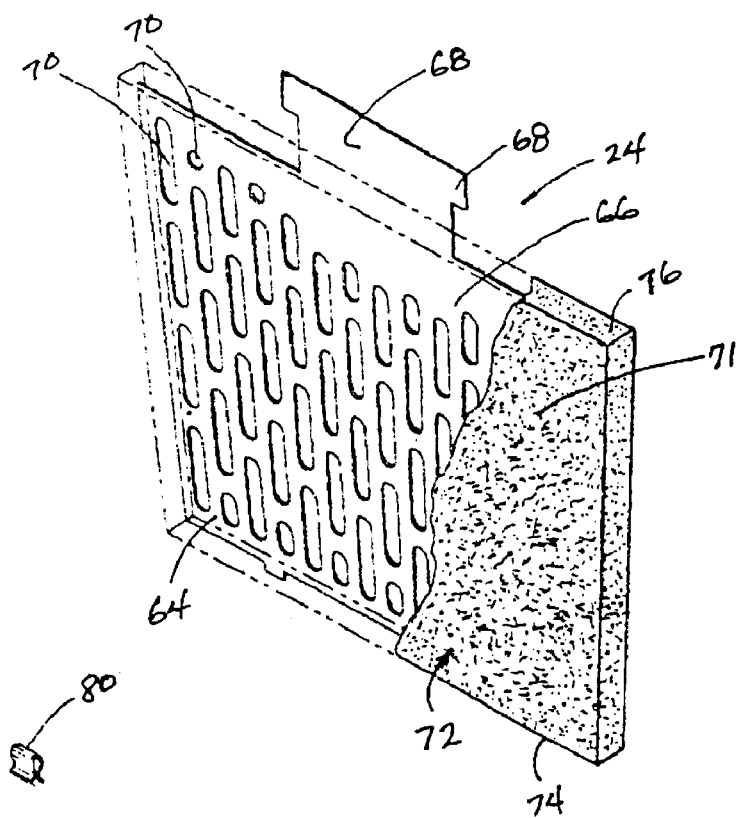
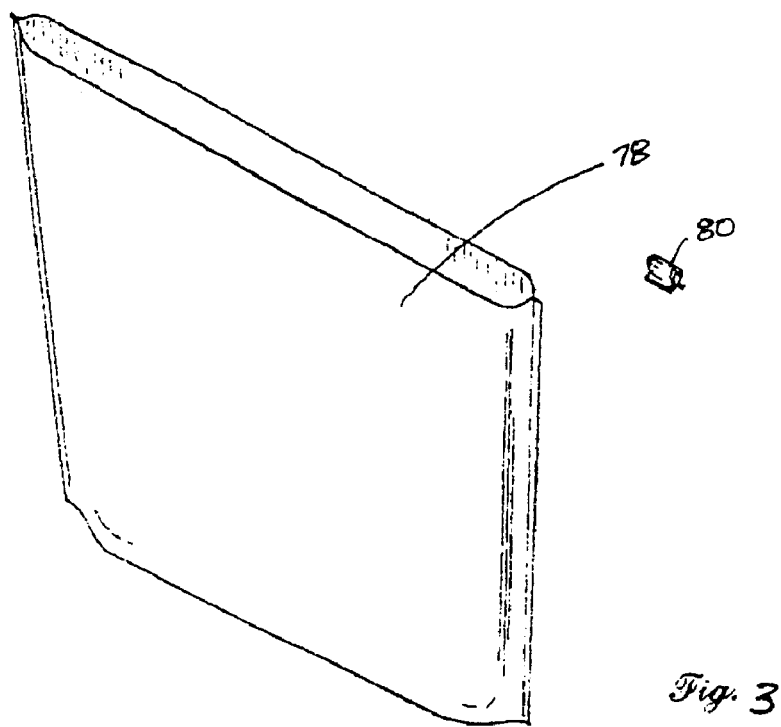
Fig. 3

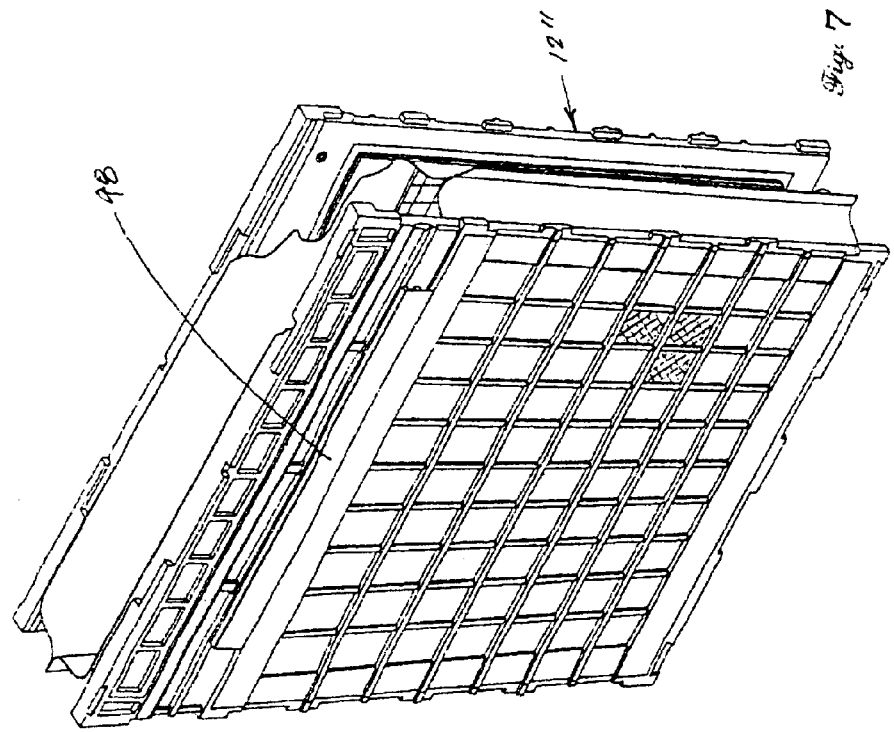
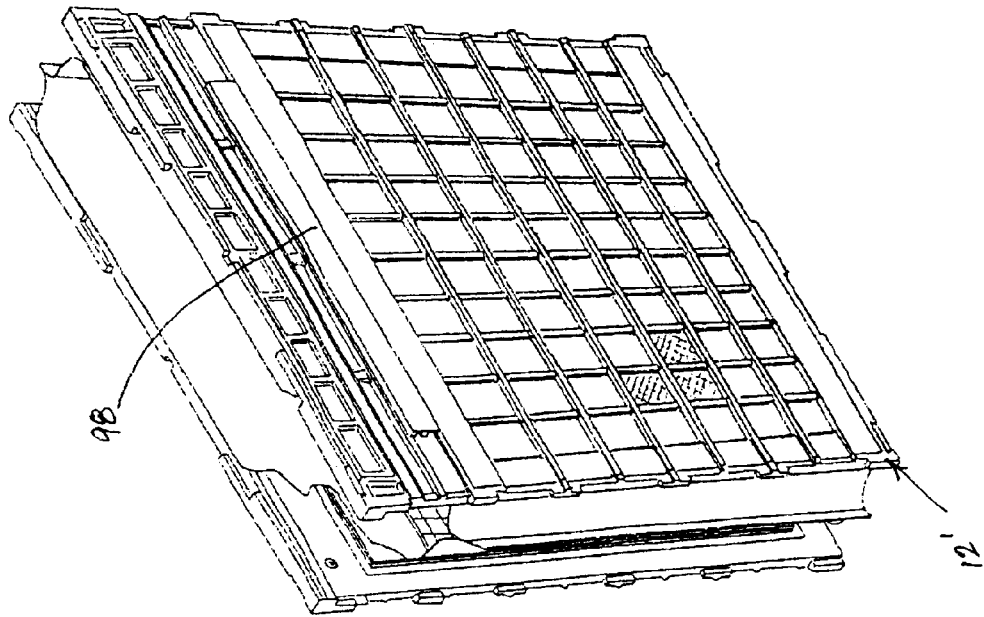

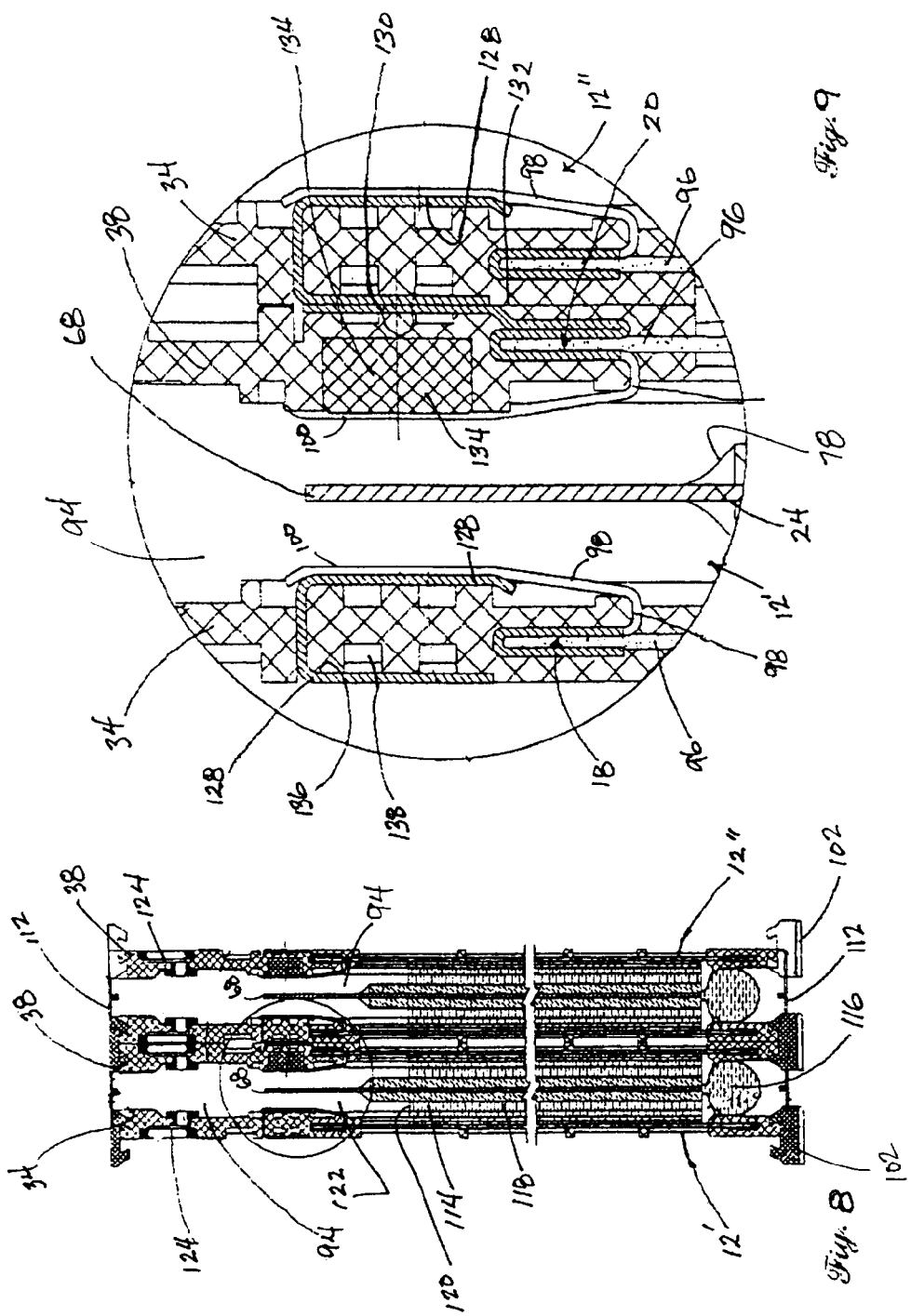

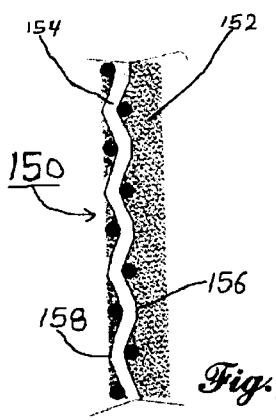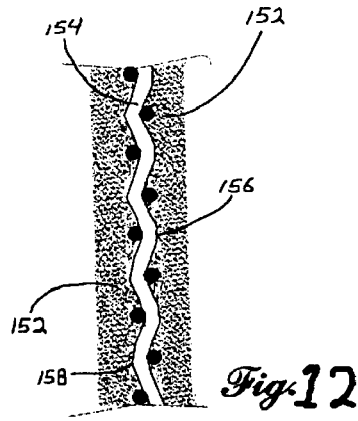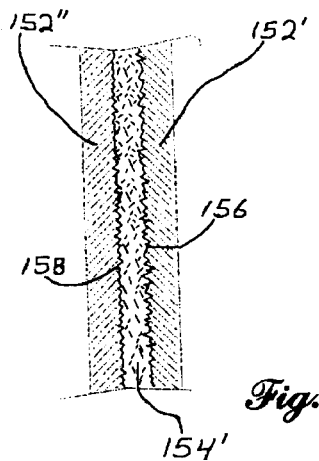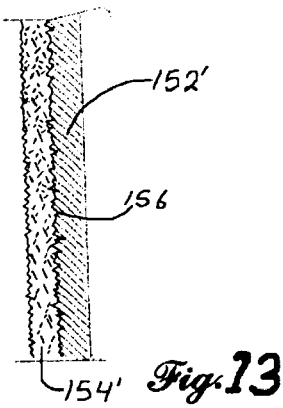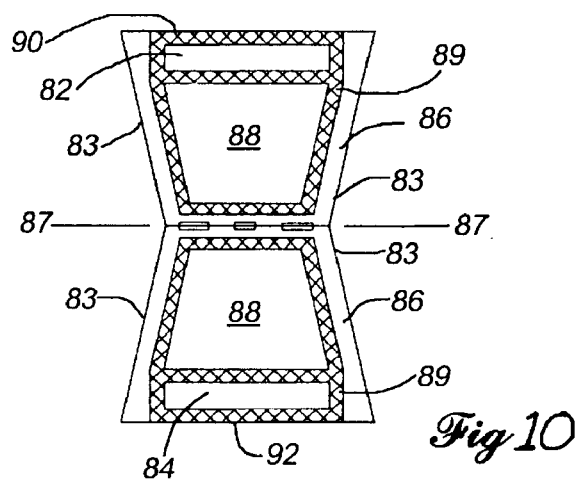

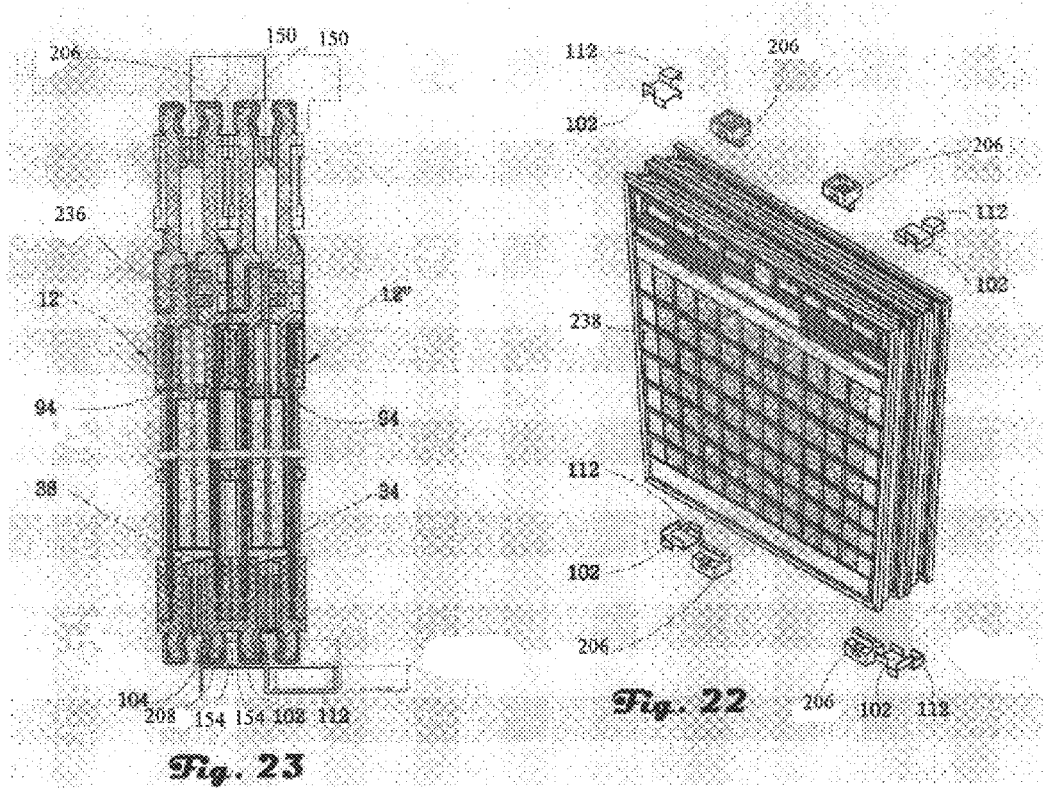

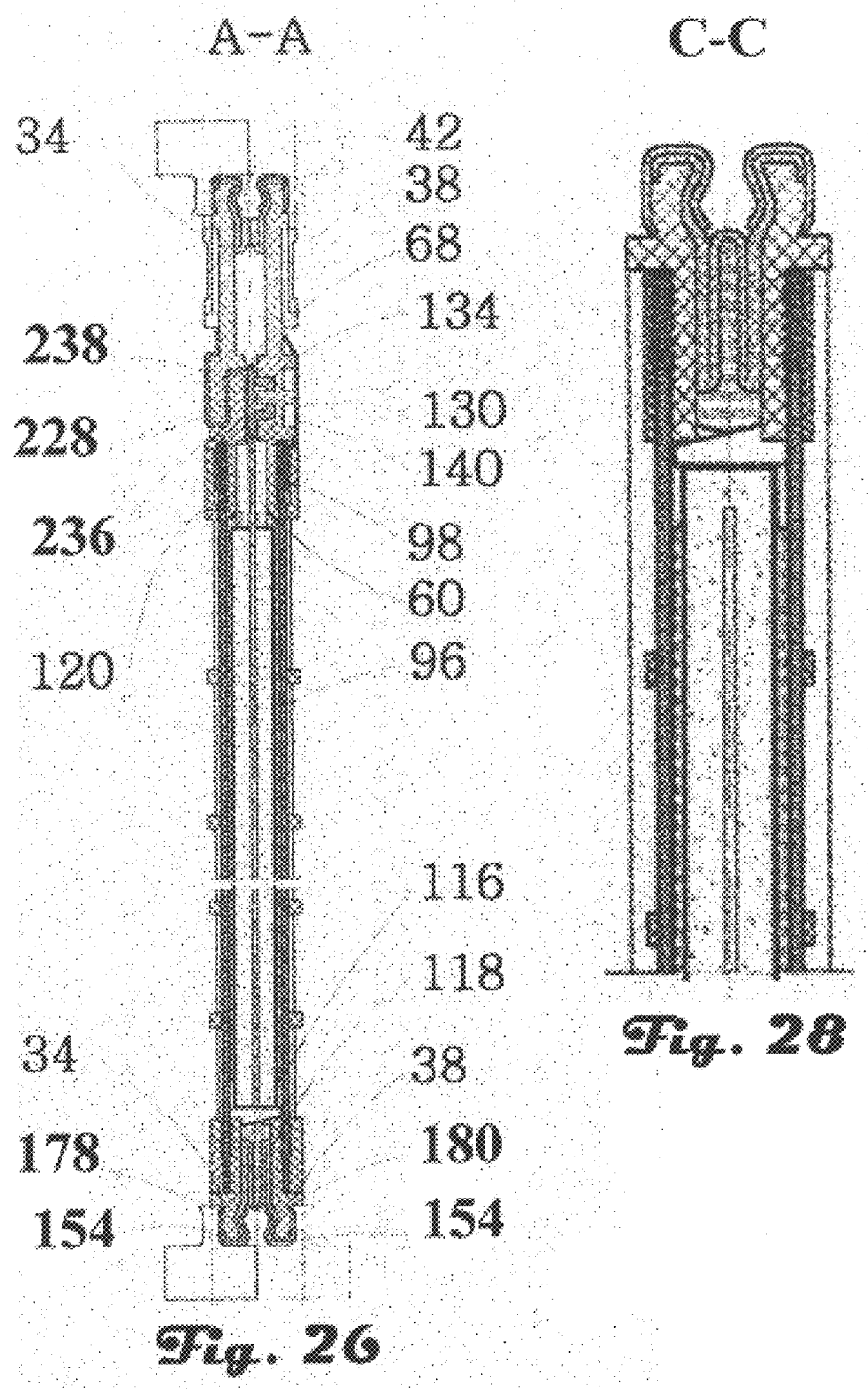

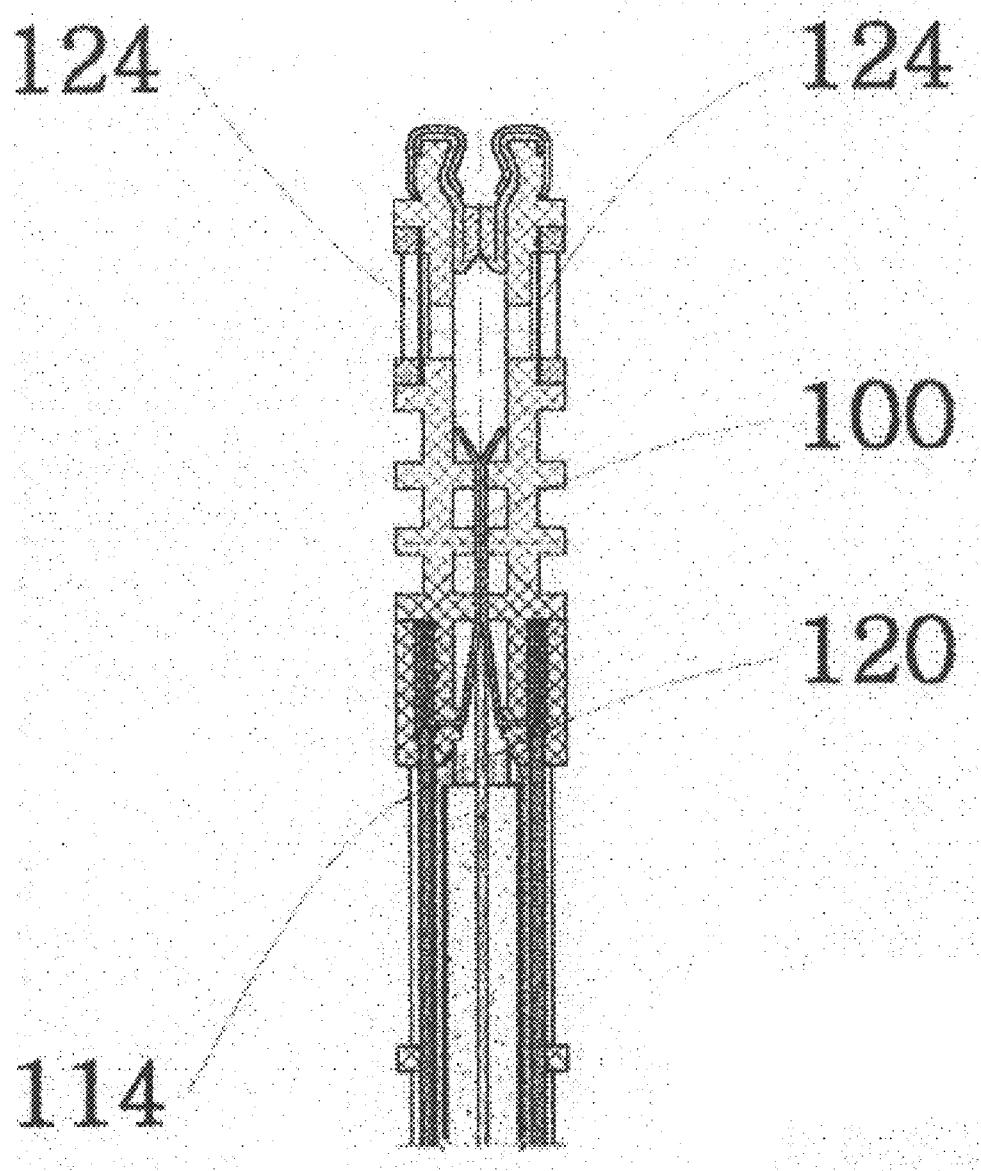

METAL-GAS CELL BATTERY WITH SOFT POCKET

CROSS REFERENCE TO RELATED APPLICATIONS

This is a continuation-in-part of Ser. No. 09/682,012, filed Jul. 9, 2001, "Metal-Gas Cell Battery with Soft Pocket," now abandoned, which is a continuation-in-part of Ser. No. 09/681,260, filed Mar. 9, 2001, now abandoned, "Metal-Gas Cell Battery with Soft Pocket."

BACKGROUND OF INVENTION

This invention relates generally to metal-gas cell batteries, such as metal-air cell batteries, and, more particularly, to mechanically rechargeable metal-air cell batteries.

More powerful, longer-lasting batteries are a high priority item for all countries seeking to replace hydrocarbon fueled vehicles with smogless electrically powered vehicles. In this regard, a great deal of research is presently focused on metal-gas cell batteries, such as zinc-air batteries. Zinc-air batteries have among the highest theoretical specific energy content of all known battery types. Many problems, however, must be overcome before vehicles powered by zinc-air batteries are regarded as acceptable alternatives to hydrocarbon burning vehicles.

All metal-gas cell batteries comprise a plurality of cells wherein each cell has at least one gas-diffusion cathode and a metallic anode separated by a quantity of alkaline electrolyte and some form of mechanical separation sheet. In the operation of metal-gas cell batteries, a reactant gas, such as oxygen, reacts at each gas-diffusion cathode to form anions. At each anode, the anions react with metallic anode material. The process creates an electrical potential between each cathode and each anode. When the cells are connected in series, the combined electrical potential of all of the cells can be considerable, and can be used as a source of electrical power. As can be seen, however, the operation of the battery gradually depletes the available metallic anode material and the battery has to be periodically recharged.

Metal-gas cell batteries can be recharged either electrically or mechanically. Electrical recharging can be easily adapted to existing power networks, but electrically rechargeable batteries have a markedly limited service life. Moreover, an electrically rechargeable metal-gas battery requires a bi-functional or additional gas diffusion electrode. Having to use such a bi-functional or additional gas diffusion electrode requires that the battery be unduly heavy, bulky and complicated.

Accordingly, the recharging mode of choice for metal-gas cell batteries is presently mechanical refueling, whereby the spent metallic anode is physically replaced with a fresh anode. Mechanical refueling can be accomplished in two ways. In a first way, the metallic anode comprises metallic pellets or powder suspended within the electrolyte. When the metallic pellets or powder becomes spent, the metallic pellets or powder is pumped from the cell and fresh pellets or powder is pumped into the cell. U.S. Pat. Nos. 3,981,747, 5,006,424, 5,434,020 and 5,558,947 disclose attempts to use zinc particles or pellets as anodes.

The second way of mechanically refueling a metal-gas battery is far simpler than the first way. In the second way, the metallic anode is a rigid structure. When the metallic anode becomes spent, the anode is removed and a replacement anode is reinstalled into the cell. Because of its simplicity in theory, construction, maintenance and operation, the second of the two refueling methods is generally employed. U.S. Pat. Nos. 3,513,030, 5,203,526, 5,318,861, 5,366,822, 5,418,080, 5,447,805, 5,753,384, 5,904,999 and 6,057,053 all disclose various methods of mechanically refueling metal-gas cell batteries by changing out a rigid anode structure. Each of the patents listed in the immediately previous sentence are incorporated herein by this reference in their entireties.

One problem with such prior art metal-gas cell batteries is the difficulty with which the rigid anode structures are removed from the cell and inserted into the cell. In a conventional cell where the supporting structure is wholly rigid, clearances for the removal and reinsertion of such anodes are generally very small. The gas cathodes and separator sheets are often abraded during the removal and reinsertion of the anodes. U.S. Pat. Nos. 4,389,466 and 4,560,626 disclose an attempt to solve this problem. However, the total contact area between the cone-shaped current collectors and the metallic anodes used in the batteries disclosed in these patents is not sufficient for large currents. Moreover, pinpoints on the current collectors in the batteries disclosed in these patents often make the insertion and extraction of the metallic anodes very difficult. Another attempt to solve this problem is disclosed in U.S. Pat. No. 5,286,578. In this patent, it is suggested to make a metal-gas cell battery with a wholly flexible housing. However, such housing is fragile and cannot withstand repeated refueling. Other wholly flexible housing systems are disclosed in U.S. Pat. Nos. 5,415,949 and 5,650,241. Such housing systems are unduly complex and are therefore expensive to manufacture, maintain and operate.

U.S. Pat. Nos. 4,389,466 and 4,560,626 disclose using neoprene as the material to make a soft pocket. Although neoprene is well known in the art as the most alkaline-resistant rubber, due to the elasticity of the neoprene a soft pocket made with neoprene will be heavily deformed, just like a rubber balloon filled with water. This will result in fatigue of a neoprene-made soft pocket too early in the later refueling process.

U.S. Pat. No. 5,286,578 discloses a collapsible electrochemical cell using "a flexible plastic material" to satisfy its collapsible design. No detail of the flexible plastic material was disclosed, however. Similarly, U.S. Pat. No. 5,415,949 suggests using a pouch cathode, but no teaching is given on how to make the pouch.

Another problem with metal-air cell batteries, which are mechanically refueled by physical replacement of a rigid anode structure is the frequent leakage of the alkaline electrolyte. In most prior art designs, the housing of the metal-gas cell is usually opened at the top. The opening is sealed during operation by some form of elastic sealing element disposed between the cell housing and a protruding portion of the anode assembly. This protruding portion of the anode assembly is universally used in such designs for electrical connection to battery electrodes. Moreover, it is common to provide one or two small breathing holes along the uppermost portion of the cell proximate to the protruding portion of the anode. However, alkaline solution tends to creep up the anode and out of the cell along the protruding portion of the anode. Also, alkaline mist continuously escapes through the breathing holes. Such leakage and mist can cause rapid oxidation of the conductors above the anode and the air cathode. Oxidation dramatically increases the electrical resistance between the contacted surfaces and therefore results in a marked loss of battery power. Moreover, the continuing leaking of alkaline electrolyte and electrolyte mist makes the battery difficult to use in any kind of environment where oxidation of metallic items outside of the battery is a problem. Finally, any upset of the battery during handling or operation will cause copious leakage of electrolyte out of the battery.

Accordingly, there is a need for a metal-gas cell battery which is conveniently rechargeable by mechanical replacement of anode material and which avoids the aforementioned problems in the prior art.

SUMMARY OF INVENTION

The invention satisfies this need. The invention is a metal-gas cell storage battery comprising at least one battery cell. Each battery cell comprises (i) a first gas cathode disposed within a rigid planar first retaining structure, the first gas cathode being permeable to air but impermeable to liquids, the first gas cathode allowing the passage of gases into the cell, (ii) a second gas cathode disposed within a rigid planar second retaining structure, the second gas cathode being permeable to air but impermeable to liquids, the second gas cathode allowing the passage of gases into the cell, the second retaining structure being moveable with respect to the first retaining structure between a first retaining structure position wherein the first retaining structure is proximate to the second retaining structure and a second retaining structure position wherein the first retaining structure is spaced apart from the second retaining structure, the second gas cathode being electrically connected to the first gas cathode, (iii) a soft pocket disposed between the first gas cathode and the second gas cathode, the soft pocket having a flexible and planar first wall and a flexible and planar second wall, the first wall having a periphery and a central opening, the periphery of the first wall including a top edge, the second wall having a periphery and a central opening, the periphery of the second wall including a top edge, the periphery of the first wall connected to the periphery of the second wall except along the respective top edges, the periphery of the first wall being attached to the first retaining structure and the periphery of the second wall being attached to the second retaining structure, whereby the first retaining structure, the first gas cathode, the first wall, the second wall, the second retaining structure and the second gas cathode cooperate to define a liquid retaining soft pocket chamber having a soft pocket lower portion, a soft pocket upper portion and a soft pocket top opening defined between the top edges of the first and second walls, the soft pocket top opening being open in the second retaining structure position and tightly closed in the first retaining structure position, (iv) a soft pocket closing mechanism for securing the first and second retaining structures in the first retaining structure position, and (v) a metallic anode disposed within the soft pocket chamber.

The cell further comprises a positive first battery positive terminal electrically connected to the two gas cathodes and a negative second battery negative terminal electrically connected to the metallic anode.

In a typical embodiment of the invention, the gas cathode is an air cathode and the metallic anode is comprised substantially of metallic zinc.

In a preferred embodiment of the invention, the metallic anode is wholly disposed within the soft pocket chamber.

In another embodiment of the invention, the battery further comprises a second semi-permeable membrane disposed within the upper portion of the soft pocket chamber to reduce the pressure difference between the soft pocket chamber and the outside atmosphere.

In another embodiment of the invention, the soft pocket is made of a fabric reinforced membrane, such as vinylon or nylon fabric coated on one or both sides with neoprene, or of polypropylene or polyethylene with coating on one side of polypropylene or polyethylene, or of polypropylene or polyethylene with coating on a first side of polypropylene or polyethylene, and a coating on a second side of PVC. The fabric may be alkaline-resistant and selected from the group consisting of vinylon, nylon, polypropylene, polyethylene, ethylene propylene diene monomer, butyl rubber, ethylene-propylene copolymer, and chlorosulfonated polyethylene.

In a typical embodiment, the soft pocket closing mechanism is provided by one or more straps which circumscribe the one or more cells. Optionally, the soft pocket closing mechanism comprises one or more than one bolt and one or more than one nut. In one embodiment the soft pocket is comprises a molded integral piece w-shaped in cross section.

In a further embodiment of the invention, the periphery of the first wall is attached to the first retaining structure and the periphery of the second wall is attached to the second retaining structure, by mechanical force without glue.

The invention provides a metal-gas cell battery, such as a zinc-air battery, which is suitable for rapid refueling and which is sufficiently durable for hundreds of refueling operations. The invention also provides a metal-gas cell battery which does not leak electrolyte or electrolyte mist.

BRIEF DESCRIPTION OF DRAWINGS

These and other features, aspects and advantages of the present invention will become better understood with reference to the following description, appended claims and accompanying drawings where:

FIG. 3 is a perspective view of an anode useable in the battery of FIG. 1.

FIG. 7 is a perspective view of the pair of cells shown in FIG. 6.

FIG. 8 is a cross-section view of two cells such as those illustrated in FIG. 7.

FIG. 9 is a detailed view of the circled area in FIG. 8.

FIG. 10 is a view of the unfolded soft pocket of FIG. 4.

FIG. 11 is a cross-section view of one embodiment of a coated fabric useable in the soft pocket of FIG. 4.

FIG. 12 is a cross-section view of a further embodiment of a coated fabric useable in the soft pocket of FIG. 4.

FIG. 13 is a cross-section view of a preferred embodiment of a coated fabric useable in the soft pocket of FIG. 4.

FIG. 14 is a cross-section view of a further embodiment of a coated fabric useable in the soft pocket of FIG. 4.

FIG. 18 is an exploded view of the cell housing shown in FIG. 16.

FIG. 22 is an exploded view of a pair of cells useable in the invention.

FIG. 23 is a cross-section view of two cells such as those illustrated in FIG. 22.

FIG. 26 is a cross-section view of the cell of FIG. 25.

FIG. 27 is another cross-section view of the cell of FIG. 25.

FIG. 28 is a cross-section view of the cell of FIG. 25.

DETAILED DESCRIPTION

Figure 1:
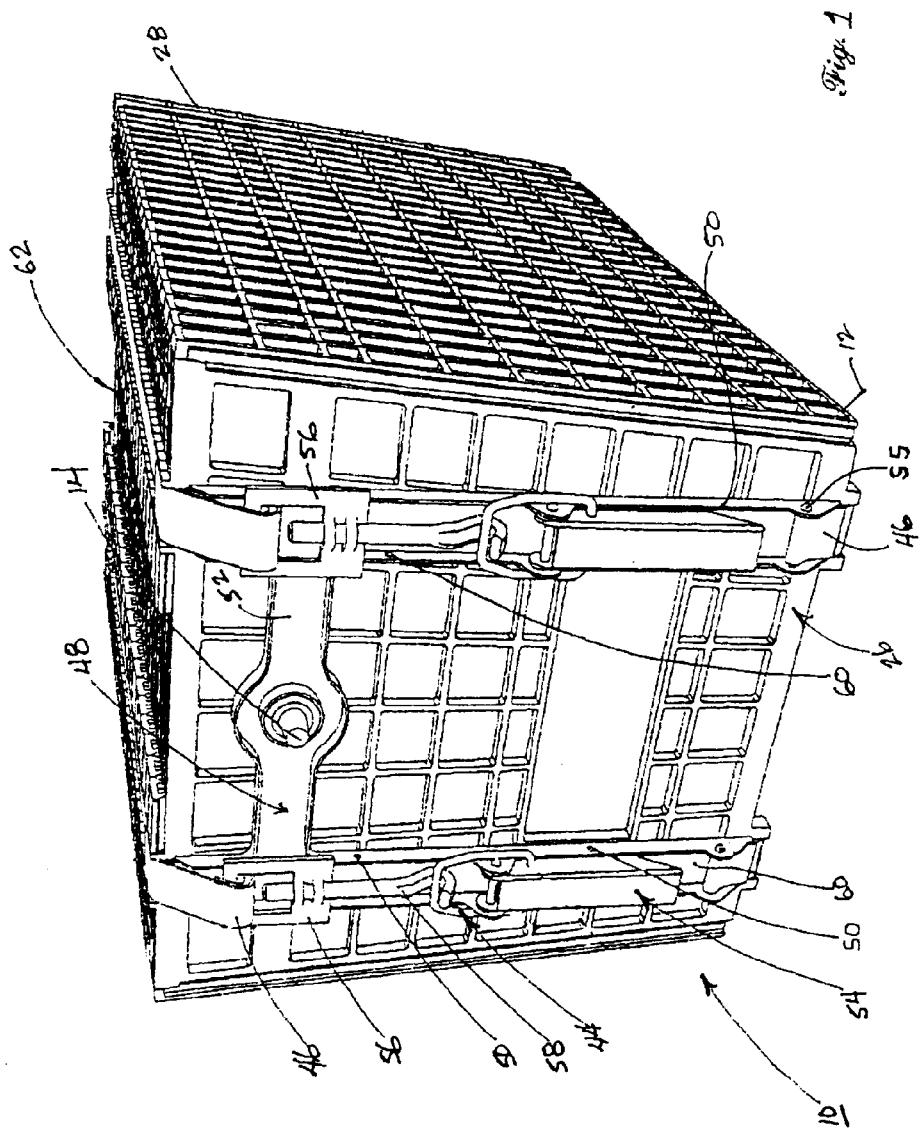
FIG. 1 is a perspective view of a metal-gas battery having features of the invention.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a metal-gas cell battery 10 comprising at least one battery cell 12, a positive first battery terminal 14 and a negative second battery terminal (not shown). Typically, the battery 10 of the invention comprises a plurality of identical battery cells 12. In the discussion which follows, a typical embodiment is described wherein the battery 10 comprises a plurality of battery cells 12, the reactive gas is oxygen, such as from air, and the anode material is zinc or similar material.

Each battery cell 12 comprises a first gas cathode 18, a second gas cathode 20 and a soft pocket 22 disposed between the first gas cathode 18 and the second gas cathode 20. The soft pocket 22 defines a soft pocket chamber 94. Each battery cell 12 further comprises a metallic anode 24 disposed within the soft pocket chamber 94. In a preferred embodiment, but not required, embodiment of the invention, the metallic anode 24 is wholly disposed within the soft pocket chamber 94.

In the embodiment illustrated in FIG. 1, the battery of the invention 10 is a zinc-air battery comprising battery cells 12 connected in series. The battery 10 can comprise any number of battery cells 12, depending upon what voltage is desired.

The battery 10 comprises a front cover plate 26 and a rear cover plate 28. The cover plate 26 protects the outermost gas cathode 18 in the first battery cell and the cover plate 28 protects the outermost gas cathode 20 in the last battery cell.

FIGS. 2–9 illustrate a typical cell 12 useable in the battery 10. Each first gas cathode 18 is a gas cathode disposed within a rigid planar first retaining structure 34. The first gas cathode 18 is permeable to a reactive gas but impermeable to liquids. Where the reactive gas is atmospheric oxygen, the first gas cathode 18 allows the passage of oxygen from the atmosphere into the cell 12.

The second gas cathode 20 is disposed within a rigid planar second retaining structure 38. The second gas cathode 20 also is permeable to a reactive gas but impermeable to liquids. Where the reactive gas is atmospheric oxygen, the second gas cathode 20 allows the passage of oxygen from the atmosphere into the cell 12.

The second retaining structure 38 is moveable with respect to the first retaining structure 34 between a first retaining structure position, wherein the first retaining structure 34 is proximate to the second retaining structure 38, and a second retaining structure position wherein the first retaining structure 34 is spaced apart from the second retaining structure 38.

Both the first gas cathode 18 and the second gas cathode 20 comprise a supporting lattice structure 40 which allows sufficient air flow through the gas cathodes 18 and 20.

The soft pocket 22 has a soft pocket top opening 42 which is open in the second retaining structure position and which is tightly closed in the first retaining structure position. By "tightly closed," it is meant that the soft pocket top opening 42 is sufficiently sealed to prevent the leakage of electrolyte or electrolyte fumes from the soft pocket chamber 94.

As illustrated in FIG. 1, a soft pocket closing mechanism 44 is provided for securing the first and second retaining structures 34 and 38 in the first retaining structure position. In the embodiment illustrated in the drawings, the soft pocket closing mechanism 44 is provided by a pair of straps 46. In other embodiments, a single strap 46 can be used. In still other embodiments, one or more clamps can be used. In still further other embodiments, screws protruding from the front cover plate 26 to the rear cover plate 28 can be used. An embodiment using screws is described below.

In the embodiment illustrated in the drawings, each of the straps 46 can be a conventional packing strap made from polypropylene or other suitable material. In the embodiment illustrated in FIG. 1, the opposed ends of each strap 46 are affixed to an H-shaped structure 48 having a pair of parallel vertical members 50 and a single lateral member 52. Both the vertical members 50 and the lateral member 52 can be U-shaped in cross-section to provide structural rigidity. An H-shaped structure 48 is affixed to both the front cover plate 26 and the rear cover plate 28, for example, by screws.

As can be seen from FIG. 1, both of the vertical members 50 on the H-shaped structure 48 comprise latch mechanisms 54 for tightening down on the pair of straps 46. The lower end of each strap 46 is attached to a latch mechanism 54 at the lower end of one of the vertical members 50 by a pin 55, and the upper ends of each strap 46 are attached to an attachment ring 56 disposed proximate to the upper end of one of the vertical members 50. Each attachment ring 56 has a threaded hook 58 which can be adjustably threaded into the attachment ring 56 or threaded out of the attachment ring 56. Each hook 58 is disposed such that it can be engaged by one of the two latch mechanisms 54.

The H-shaped structure 48 on the rear cover plate 28, however, has no latching mechanisms 54, pin 55, rings 56 or hooks 58. On the rear cover plate 28, each of the two straps 46 are retained within one of the U-shaped troughs 60 in the two vertical members 50.

The positive first battery terminal 14 can be a male cone-shaped structure disposed in the front cover plate 26 as illustrated in FIG. 1. The negative second battery terminal can be a corresponding female cone-shaped structure disposed in the rear cover plate 28. The first battery terminal 14 is electrically connected to the two gas cathodes 18 and 20 which adjoins the first terminal 14. The second battery terminal is electrically connected to the anode 24 which adjoins the second battery terminal.

Air for providing cooling and reactive oxygen to the battery 10 can be flowed through the battery 10 through gaps 62 disposed between the battery cells 12.

In the embodiment illustrated in the drawings, the anode 24 is wholly disposed within the soft pocket 22. FIG. 3 illustrates a typical anode 24 in detail. In the embodiment illustrated in FIG. 3, the anode 24 comprises an electrically conductive support structure 64 having a support structure base portion 66 and a support structure tab portion 68 disposed above the support structure base portion 66. The support structure base portion 66 and the tab portion 68 can be made from any conductive material. Copper is a preferred material because of its low cost, rigidity and high conductivity. The support structure base portion 66 should be rigid enough to minimize damage or distortion during recycling, and should provide a large cross-sectional area to allow high current flow with minimal voltage drop. In the embodiment illustrated in FIG. 3, holes and slots 70 are disposed within the support structure base portion 66 to reduce the weight of the support structure 64 and to join the metal powder 71 (discussed immediately below) on both sides of the support structure base portion 66 into an integral whole.

Figure 17:
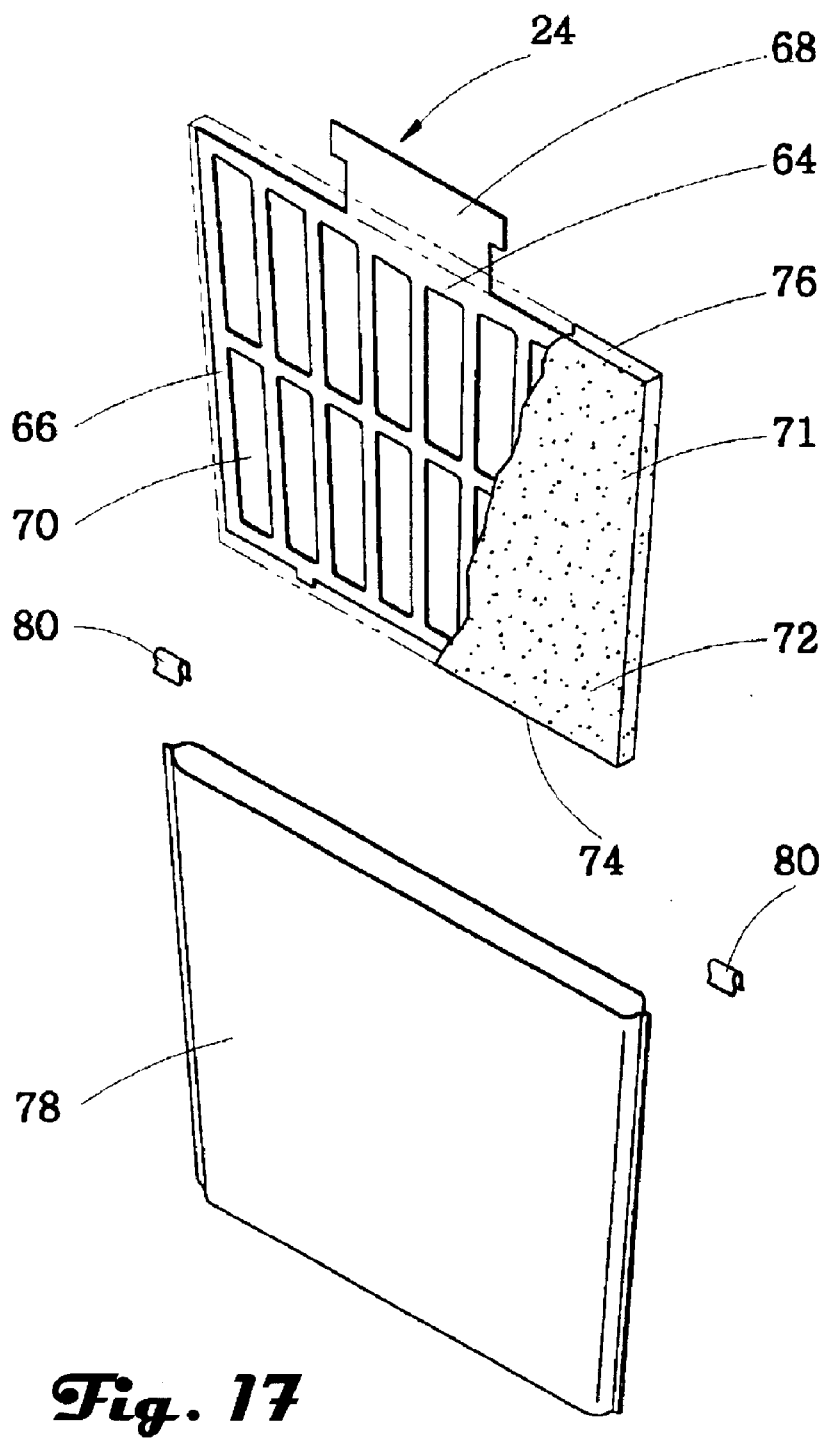
FIG. 17 is a perspective view of an anode useable in the battery of FIG. 15.
Figure 16:
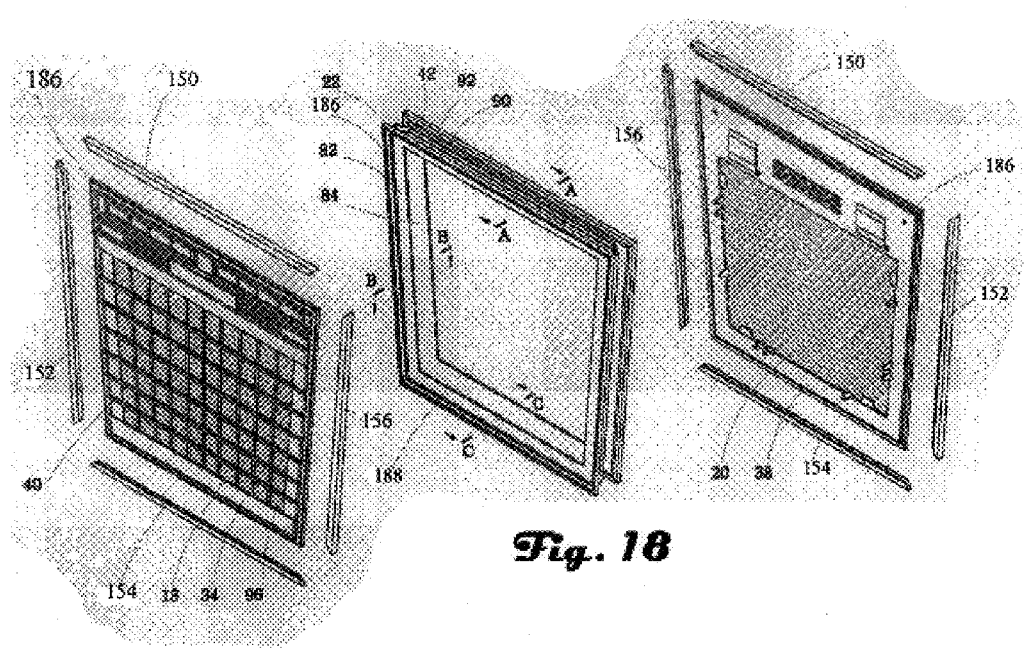

Another embodiment of a typical anode is illustrated in FIG. 17.

A metal powder 71, such as zinc powder, is pressed onto the support structure base portion 66 to provide an anode base portion 72. Preferably, the holes and slots 70 in the support structure base portion 66 are located and configured such that the electrical resistance between all particles of the zinc powder 71 and the support structure anode base portion 72 is nearly identical.

The anode base portion 72 is preferably planar and shaped to provide a large surface area. To facilitate the installation of the anode 24 into the soft pocket 22, it is also preferable that the lowermost edge 74 of the anode base portion 72 be shorter than the length of the uppermost edge 76 of the anode base portion 72. Thus, in a typical embodiment, the anode base portion 72 is trapezoidal in shape with the lowermost edge 74 of the anode base portion 72 being slightly shorter in length than the uppermost edge 76 of the anode base portion 72. In such embodiments, it is also typical for the soft pocket 22 to have an equivalent shape.

The tab portion 68 of the support structure 64 provides a convenient handle which is useful in the installing and de-installing of the anode 24 from the soft pocket 22. The tab portion 68 further provides an electrical connection means for the anode 24 as described below. In those preferred embodiments wherein the anode 24 is wholly disposed within the soft pocket 22 during operation, the tab portion 68 needs no sealing elements.

Figure 2:
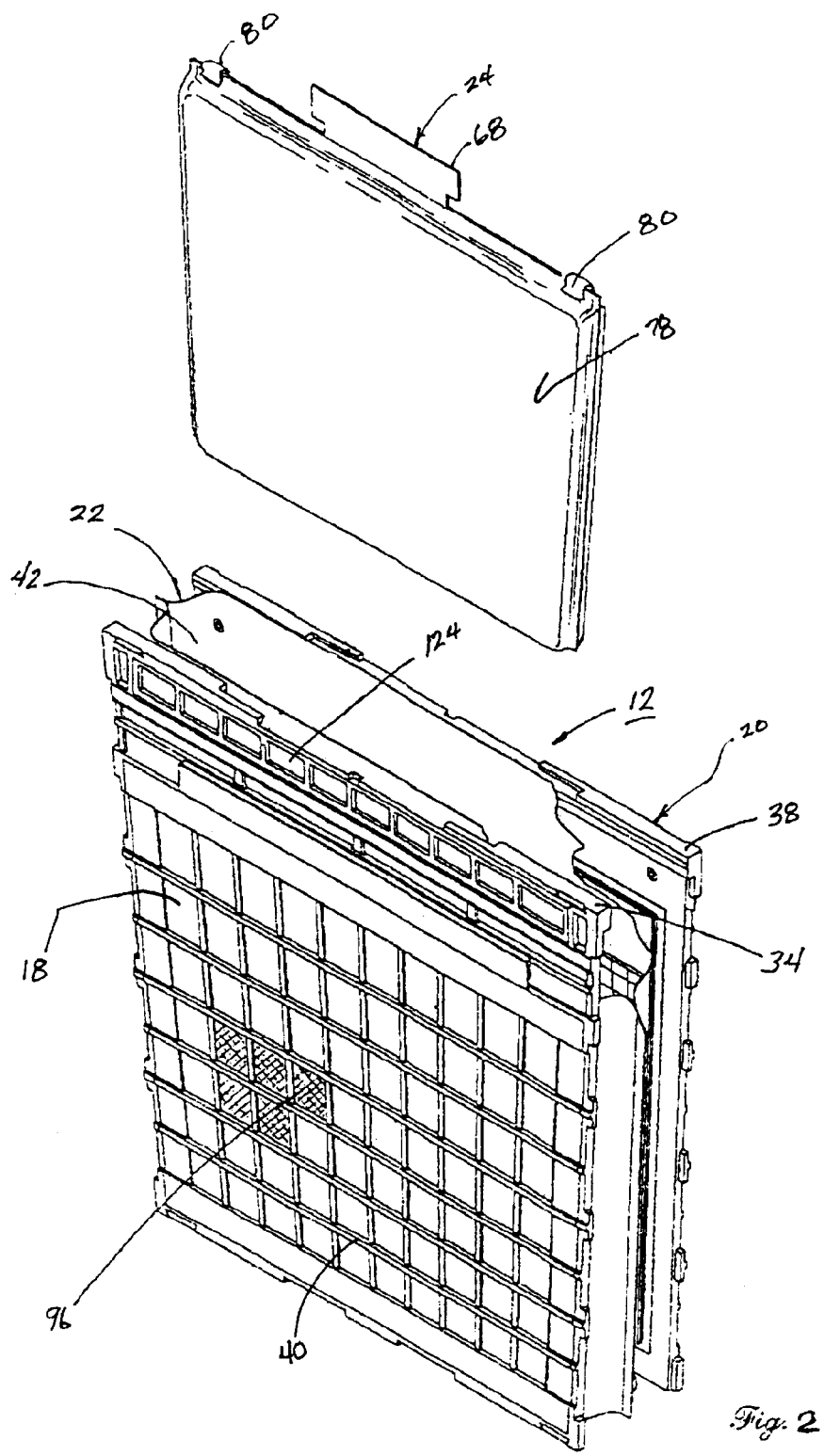
FIG. 2 is a perspective view of a metal-gas cell useable in the battery of FIG. 1.

The anode base portion 72 is disposed within an enclosure bag 78 as illustrated in FIGS. 2 and 3. The enclosure bag 78 can be any suitable porous flexible material, such as a porous plastic membrane, woven fabric or non-woven fabric. The enclosure bag 78 is held in place around the anode base portion 72 by a pair of clips 80.

Figure 4:
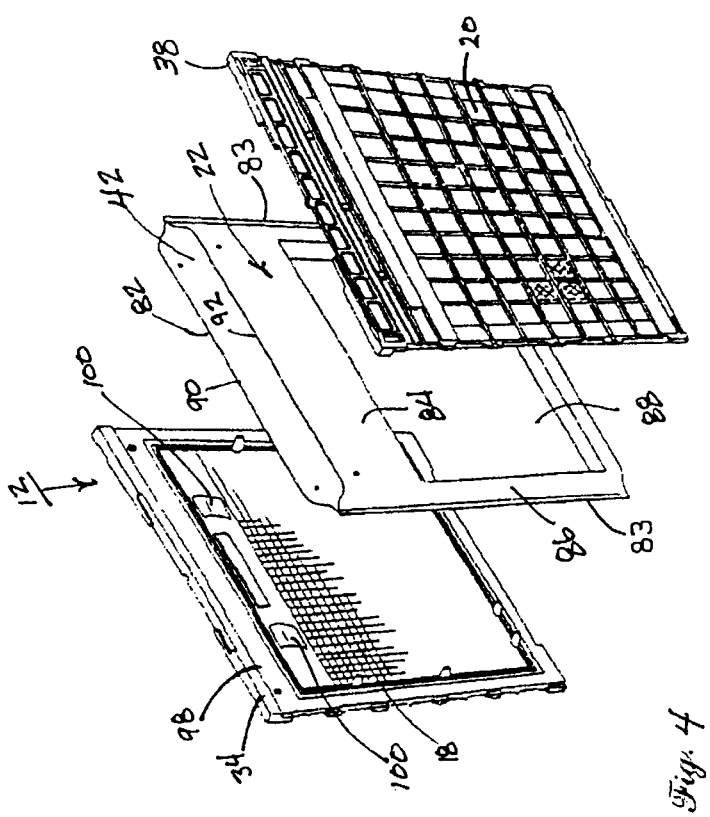
FIG. 4 is an exploded view of the cell housing shown in FIG. 2.

FIG. 4 illustrates an exploded view of the battery cell 12 illustrated in FIG. 2. As can be seen from this view, the soft pocket 22 comprises a flexible and planar first wall 82 and a flexible and planar second wall 84. Both the first wall 82 and the second wall 84 have a periphery 86 and a central opening 88. The periphery 86 of the first wall 82 includes a top edge 90 and the periphery 86 of the second wall 84 also comprises a top edge 92. In the embodiment illustrated in the drawings, the periphery 86 of the first wall 82 further comprises left and right edges 83 and the periphery 86 of the second wall 84 further comprises left and right edges 83. The periphery 86 of the first wall is attached to the first retaining structure 34 by adhesives or other similar attachment means. Similarly, the periphery 86 of the second wall 84 is attached to the second retaining structure 38 by adhesives or other similar attachment means.

FIG. 10 illustrates a preferred method for making the soft pocket 22. A single sheet of the chosen material for the soft pocket 22 is punched to the shape shown in FIG. 10, having two openings 88, periphery 86, left and right edges 83, top edge 90, and top edge 92. The material is folded along fold line 87, and sealed along the left and right edges 83 by a suitable means to form the soft pocket 22. Top edge 90 and top edge 92 are not sealed, so that soft pocket top opening 42 is created. Adhesive surfaces 89 are a preferred location for the adhesive to attach the periphery 86 of the first wall to the first retaining structure 34, and the periphery 86 of the second wall 84 to the second retaining structure 38.

By this design, the first retaining structure 34, the first gas cathode 18, the first wall 82, the second wall 84, the second retaining structure 38 and the second gas cathode 20 cooperate to enclose the soft pocket 22 so as to form the soft pocket chamber 94. The soft pocket chamber 94 is open at the top opening 42 defined between the two top edges 90 and 92 of the first wall 82 and the second wall 84. When electrolyte is disposed within the soft pocket chamber 94, such electrolyte is in contact with the first gas cathode 18 via the central opening 88 in the first wall 82 and the electrolyte is similarly in contact with the second gas cathode 20 through the central opening 88 in the second wall 84.

The planar walls 82 and 84 of the soft pocket 22 can be made from a plastic membrane or other suitable material. The first and second walls 82 and 84 of the soft pocket 22 can be made from polyethylene, polypropylene, nylon or other material capable of resisting deterioration from the electrolyte by having good alkaline-resistance.

Other materials which resist deterioration from the electrolyte and can be used include ethylene propylene diene monomer, butyl rubber, ethylene-propylene copolymer, and chlorosulfonated polyethylene.

A preferred material for making the planar walls 82 and 84 of the soft pocket 22 is fabric reinforced membrane. FIG. 11 shows a cross-section of a fabric reinforced membrane 150 useable in the present invention comprising fabric 154 having a first side 156, a second side 158, and coating 152. In the embodiment shown in FIG. 11, fabric 154 is coated on the first side 156 with a coating 152 of neoprene. If the fabric 154 is netting, the neoprene may seep to the second side 158 of fabric 154. In one embodiment having good alkaline resistance property, fabric 154 is made of vinylon. Nylon is one alternative choice for fabric 154, but its alkaline-resistance property is less than vinylon.

The same adhesive used to sealed the left and right edges 83 to form the soft pocket 22 may be used to attach the periphery 86 of the first wall 82 to the first retaining structure 34, and the periphery 86 of the second wall 84 to the second retaining structure 38. When fabric 154 is coated on only one side, the uncoated side is the preferred side to attach to retaining structures 34 and 38. When the coating 152 is neoprene, preferably the adhesive should be neoprene glue.

Another embodiment of fabric reinforced membrane 150 useable in the present invention is shown in FIG. 12. In this further embodiment, fabric 154 is coated on both the first side 156 and second side 158 with coating 152. When the coating 152 is neoprene, this construction provides very good adhesive property with the retaining structure 34 and retaining structure 38, particularly when they are constructed of ABS, although it is more expensive.

A preferred embodiment of fabric reinforced membrane 150 useable in the present invention is shown in FIG. 13. In this embodiment, fabric 154' is coated on the first side 156 with coating 152', wherein fabric 154' is non-woven polypropylene or polyethylene, and coating 152' is polypropylene or polyethylene. When non-woven polypropylene or polyethylene is used for fabric 154' it is possible to heat seal the left and right edges 83 to form the soft pocket 22, which is much easier than gluing neoprene.

Pure polypropylene or polyethylene is very difficult to be glued, due to the low surface energy of these non-polarized materials. In order to glue these kinds of materials, many methods have been developed to treat the surfaces before being glued together. None of these methods can guarantee no leakage in mass production. Due to its porous surface, when fabric 154' is made of non-woven material the glue is absorbed and can reliably be attached to ABS plastic, even when the non-woven fabric is made of polyethylene fiber or polypropylene fiber. A non-woven fabric alone, however, cannot be used to make the soft pocket 22 because it will be permeable to liquid electrolyte.

Another embodiment of fabric reinforced membrane 150 useable in the present invention is shown in FIG. 14. In this embodiment, fabric 154' is coated on the first side 156 with coating 152', and on the second side 158 with coating 152", wherein fabric 154' is non-woven polypropylene or polyethylene, coating 152' is polypropylene or polyethylene, and coating 152" is PVC. In this embodiment, the second side 158 with PVC coating 152" is the side that is attached to retaining structures 34 and 38.

Figure 5:
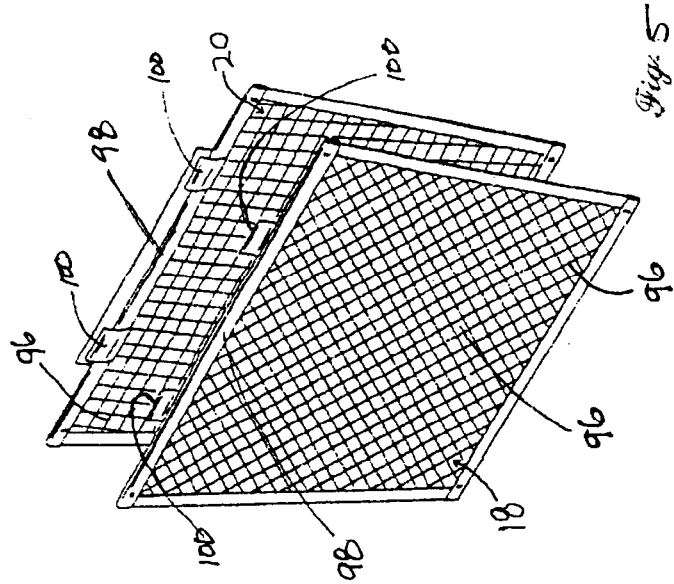
FIG. 5 is a perspective view of a pair of gas cathodes useable in the cell of FIG. 2.

FIG. 5 illustrates how the first gas cathode 18 and the second gas cathode 20 are disposed with respect to one another. The gas cathodes 18 and 20 can be any suitable gas cathodes known in the industry. Typical gas cathodes useable in the invention are manufactured by both Eltech Research Corporation and Alupower, Inc. As can be seen, both the first gas cathode 18 and the second gas cathode 20 comprise a wire mesh 96. A laterally disposed current collector 98 is disposed along the top edges of each gas cathode 18 and 20. In the embodiment illustrated in the drawings, two pairs of electrical contacts 100 extend from each current collector 98. When the second retaining structure 38 is disposed in the first retaining structure position, each pair of electrical contacts 100 are in physical contact with one another. In this way, the two gas cathodes 18 and 20 are electrically connected to one another.

Figure 21:
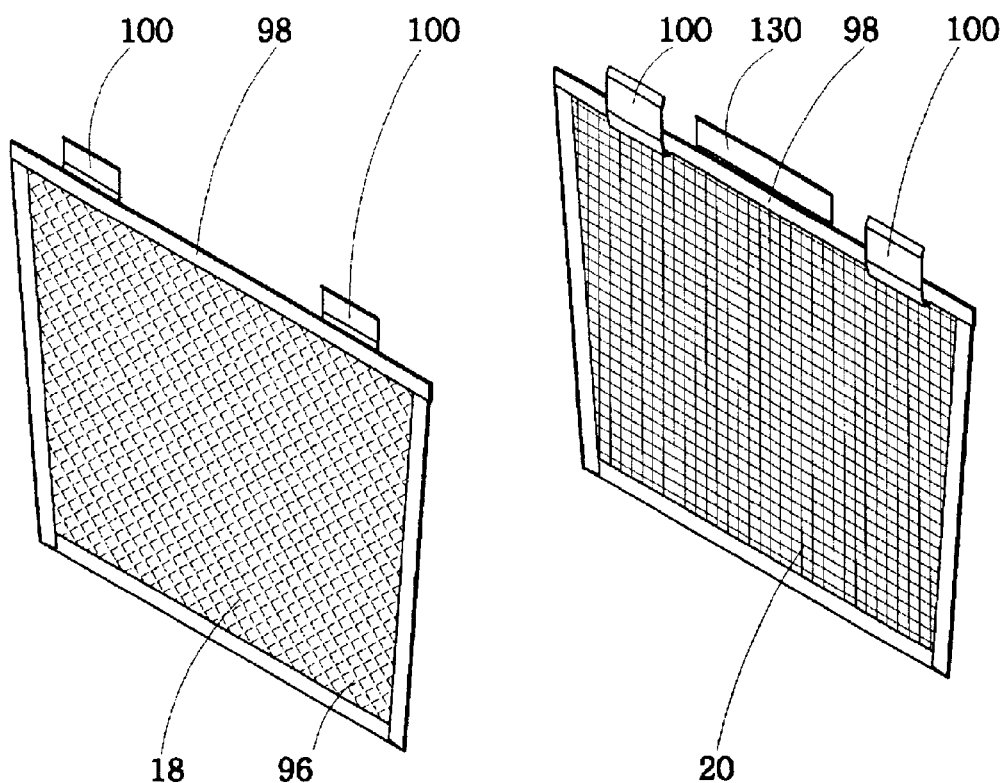
FIG. 21 is a perspective view of a pair of gas cathode s useable in the cell of FIG. 16.

Another embodiment of first gas cathode 18 and second gas cathode 20 are shown in FIG. 21.

Figure 6:
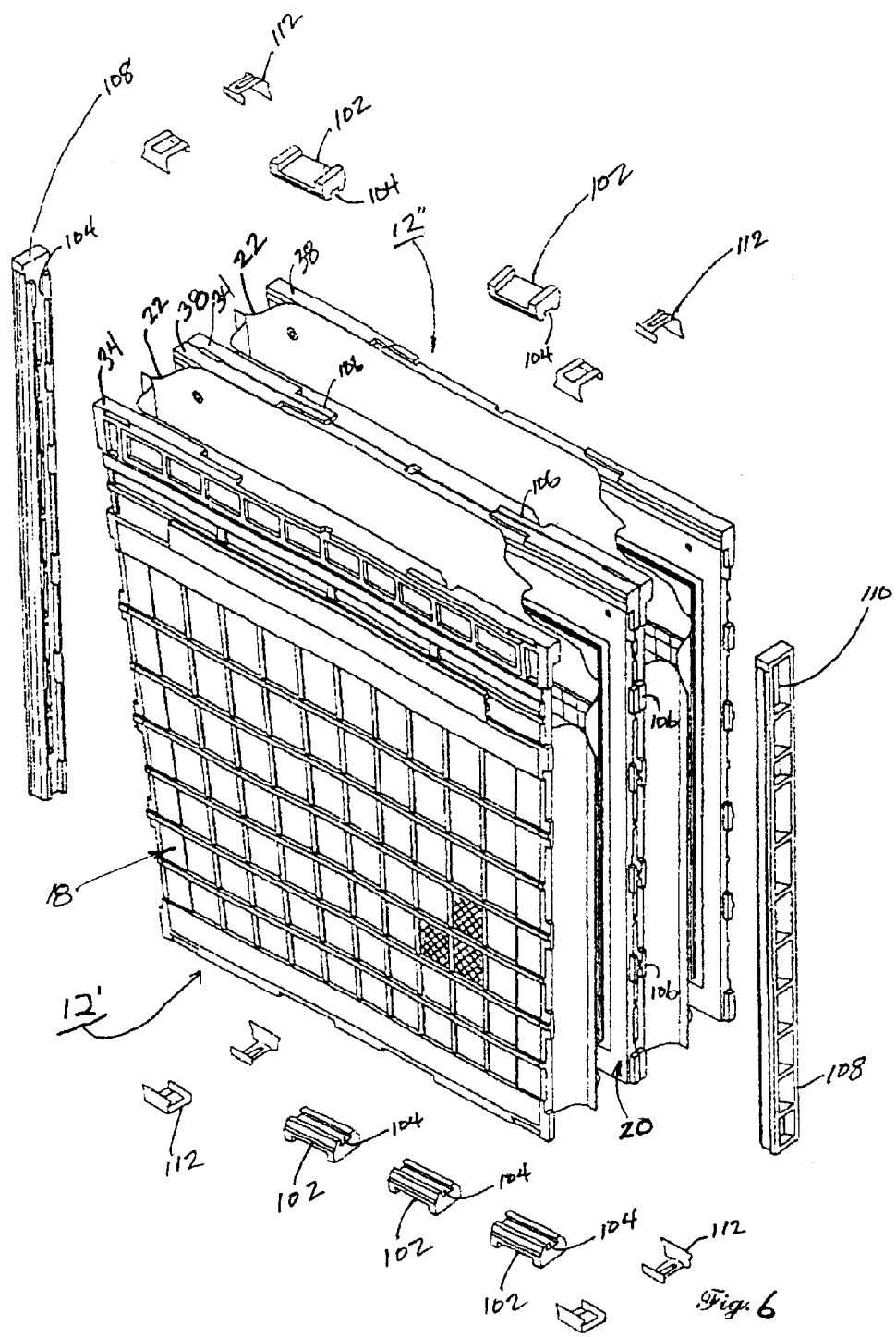
FIG. 6 is an exploded view of a pair of cells useable in the invention.

FIG. 6 illustrates an exploded view of the assembly of two adjoining battery cells 12. In the embodiment illustrated in FIG. 6, connecting blocks 102 are disposed at the top and the bottom to lock the second retaining structure 38 of a first battery cell 12' to the first retaining structure 34 of a second battery cell 12". The connecting blocks 102 have a female swallow-tailed slot 104 and the two adjoining retaining structures 34 and 38 combine to form a male swallow-tailed tenon 106 which is sized and dimensioned to be connected with the connecting blocks 102. Also in FIG. 6 are illustrated a pair of side connecting bars 108. Each connecting bar 108 has a number of swallow-tailed slots 104 which are sized and dimensioned to connect over swallow-tailed tenons 106 provided by the two adjoining retaining structures 34 and 38. The connecting bar 108 has a plurality of openings 110 to provide the influx of air into the battery cells 12.

FIG. 6 further illustrates the construction of a pair of interconnected slide fasteners which provide expansion restrainers 112 to prevent the expansion of each cell 12 beyond the second retaining structure position.

FIG. 7 illustrates a pair of fully assembled battery cells 12' and 12" which can be disposed adjacent to one another as illustrated in FIGS. 8 and 9.

FIG. 8 illustrates a cross-sectional view of a typical pair of battery cells 12 useable in the battery 10 of the invention. In FIG. 8, a first battery cell 12' is disposed in abutment with a second battery cell 12". Both battery cells 12' and 12" are shown in the second retaining structure position wherein the first retaining structure 34 of each cell 12 is spaced apart from the corresponding second retaining structure 38. As illustrated in FIG. 8, the soft pocket top opening 42 of each cell 12 comprises the expansion restrainers 112 which limit the expansion of the soft pocket top opening 42 of each cell 12 beyond the second restraining structure position. Except for the expansion restrainers 112, the soft pocket top opening 42 of each cell 12 is wholly open, so that the anode 24 within each cell 12 can be easily withdrawn from the soft pocket 22, and so that a new anode 24 can be easily inserted into each soft pocket 22. When the first and second retaining structures 34 and 38 are in the first retaining structure position, the soft pocket top opening 42 is tightly closed.

As further illustrated in FIG. 8, the battery 10 of the invention operates with an electrolyte 114 disposed within the soft pocket chamber 94. The electrolyte 114 is typically an aqueous solution of potassium hydroxide, sodium hydroxide or sodium chloride. Excess electrolyte 114 for each cell 12 is stored within a collapsible electrolyte reservoir 116 disposed at the base of the soft pocket chamber 94. The electrolyte 114 is disposed within a lower portion 118 of the soft pocket 22. That portion of the soft pocket chamber 94 above the liquid level 120 of the electrolyte 114 is referred to herein as the upper portion 122 of the soft pocket chamber 94.

In the embodiment illustrated in the drawings, the pressure balance within each cell 12 is provided by a semi-permeable membrane 124 disposed in the upper portion 122 of the soft pocket chamber 94. Such semi-permeable membrane 124 can be made from PTFE or other suitable semi-permeable membrane material. Any gas generated inside the battery cell 12 flows through the semi-permeable membrane 124 to the atmosphere. Thus, the battery 10 of this embodiment requires no breathing holes in the cell housing or in the top of the anode 24 as is common in prior art metal-gas cell designs. By the design of this embodiment, liquid and mist within the cell 12 are wholly contained within the cell 12 and are not allowed to leak externally of the cell 12.

FIG. 9 is a detailed view of a portion of the first battery cells 12 illustrated in FIG. 8. As can be seen from FIG. 9, when the second retaining structures 38 are moved from the second retaining structure position (as illustrated in FIGS. 8 and 9) to the first retaining structure position (i.e., wherein the soft pocket top openings 22 are tightly closed), the tab portion 68 of the anode support structure 64 is firmly retained between the first restraining structure 34 and the second retaining structure 38. Molded into the first retaining structure 34 is a U-shaped conductor element 128, which contacts the tab portion 68 of the anode support structure 64. The U-shaped conductor element 128 in the first retaining structure 34 of the first cell 12' is electrically connected to the gas cathodes 18 and 20 of an adjoining cell 12" (or to the negative second battery terminal if the first cell 12' is an outermost cell). The U-shaped conductor element 128 in the first retaining structure 34 of the second cell 12" is electrically connected to the gas cathodes 18 and 20 in the first cell 12' by contact with a gas cathode conductor member 130 extending from the current collector 98 and disposed at the external surface 132 of the second retaining structure 38 of the first cell 12'. Where the gas cathode conductor member 130 is disposed within an outermost cell 12, the gas cathode conductor member 130 is in direct electrical contact with the positive first battery terminal 14. To facilitate the electrical contact between the U-shaped conductor element 128 and the gas cathode conductor member 130, the contacting surfaces of the U-shaped conductor element 128 and the gas cathode conductor member 130 can be coated with silver or other suitable material to prevent possible oxidation of their respective contacting surfaces.

The second retaining structure 38 proximate to the tab portion 68 of an anode 24, which is disposed within the soft pocket 22, comprises a resilient retaining member 134. Thus, when the second retaining structure 38 is in the first retaining structure position with respect to the first retaining structure 34, the tab portion 68 of an anode 24 disposed within the soft pocket 22 is firmly retained between the second retaining structure 38 and the U-shaped conductor element 128.

The U-shaped conductor element 128 also operates to conduct heat out of the battery cell 12. In the embodiment illustrated in the drawings, the heat can be dissipated by air flowing by the inner surface 136 of the U-shaped conductor element 128 through lateral passageways 138 disposed within each retaining structure 34 and 16. The electrical contacts 100 extending from the current collectors 98 also operate to conduct heat out of the battery cell 12. The current collectors 98 are tightly pressed against the metallic mesh 96, which comprises the surfaces of the gas cathodes 18 and 20. Accordingly, the current collectors 98 conduct heat generated within the battery cell 12 to the airside surfaces of the gas cathodes 18 and 20.

The invention provides a metal-gas cell battery, such as a zinc-air battery, which is suitable for rapid refueling and which is sufficiently durable for hundreds of refueling operations. The invention also provides a metal-gas cell battery, which does not leak electrolyte or electrolyte fumes.

Figure 15:
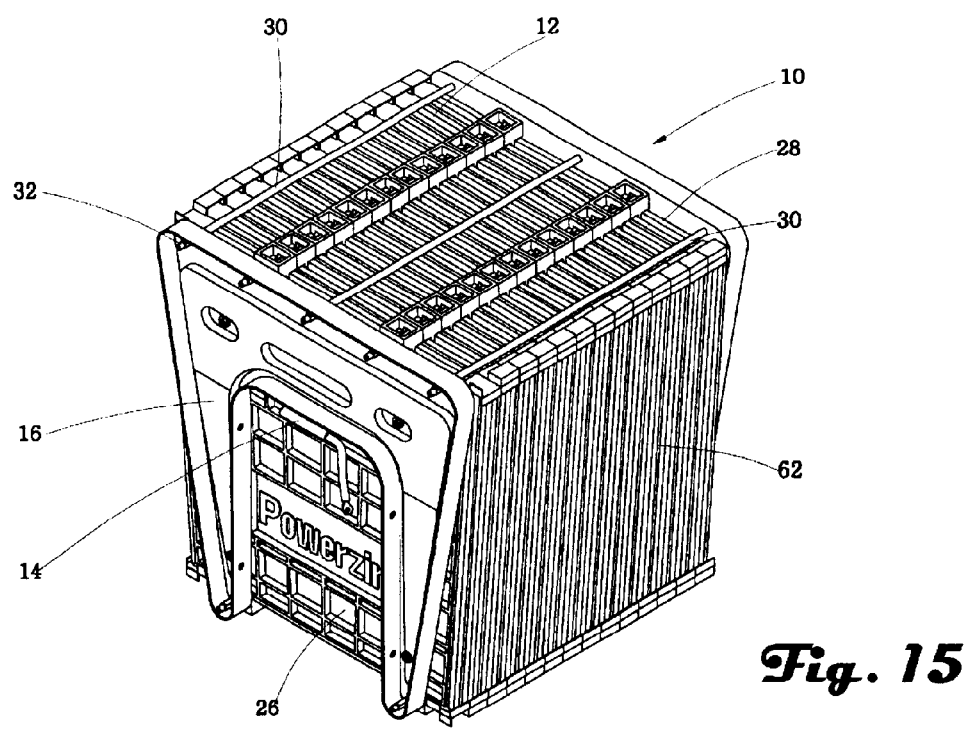
FIG. 15 is a perspective view of another embodiment of the metal-gas battery having features of the invention.

A further embodiment of the invention is shown in FIG. 15. As illustrated in FIG. 15, in this further embodiment a number of pairs of screws 30 and nuts 32 on the top and at the bottom are used to hold a plurality of the metal-gas cells together between cover plate 26 and cover plate 28 and two pi-shaped metal-fittings 16 as a single battery. The opening 42 of the soft pocket of each cell are held tightly closed by the screws 30 and the nuts 32. As will be known to those skilled in the art with reference to this disclosure, it would be possible to construct a closing mechanism in this embodiment using one or more than one bolt and one or more than one nut.

In this further embodiment the positive first battery terminal 14 optionally can be a male cone-shaped structure or, or additionally optionally a red-colored cable with an eye-pin disposed in the front cover plate 26 as illustrated in FIG. 15. The negative second battery terminal (not shown in FIG. 15) can optionally be a corresponding female cone-shaped structure or additionally optionally a black-colored cable with an eye-pin disposed in the rear cover plate 28. The first battery terminal 14 is electrically connected to the first gas cathode 18 and the second gas cathode 20 which adjoins the first terminal 14. The second battery terminal is electrically connected to the anode 24 which adjoins the second battery terminal.

Figure 16:
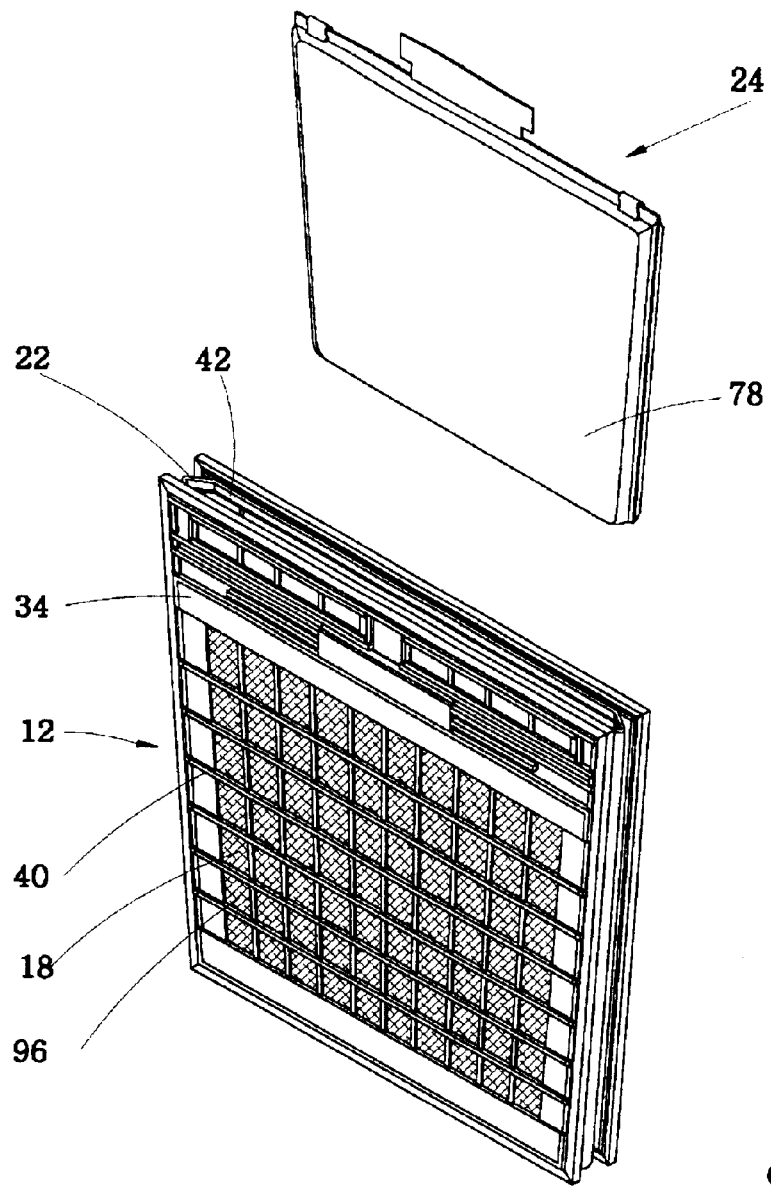
FIG. 16 is a perspective view of a metal-gas cell useable in the battery of FIG. 15.
Figures 19, 20:
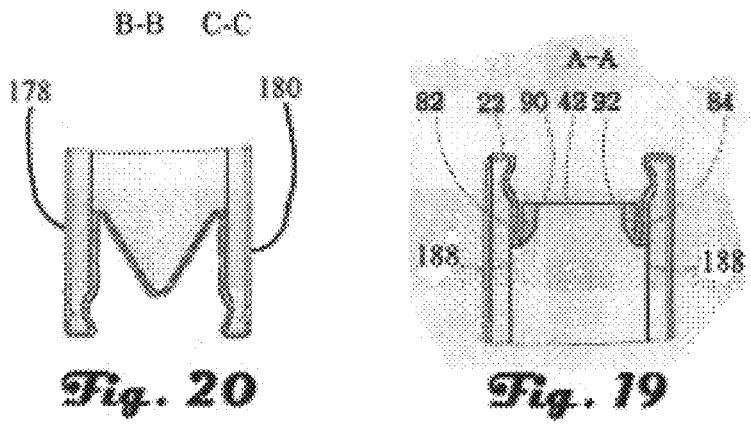
FIG. 19 is a cross-section view of a portion of the frame of the cell housing of FIG. 18.
FIG. 20 is a cross-section view of a portion of the frame of the cell housing of FIG. 18.

FIG. 18 illustrates an exploded view of the battery cell 12 illustrated in FIG. 16. The soft pocket 22 with w-shape in cross section as shown in FIG. 20 can be made of any kind of non-conductive soft material capable of resisting deterioration from the electrolyte, such as described above, or also ethylene-propylene diene monomer, butyl rubber, ethylene-propylene copolymer, chlorosulfonated polyethylene. Soft pocket chamber 94 is open at the top opening 42 defined between top edge 90 and top edge 92 of the first wall 82 and the second wall 84 as shown in FIG. 19.

Figure 29:
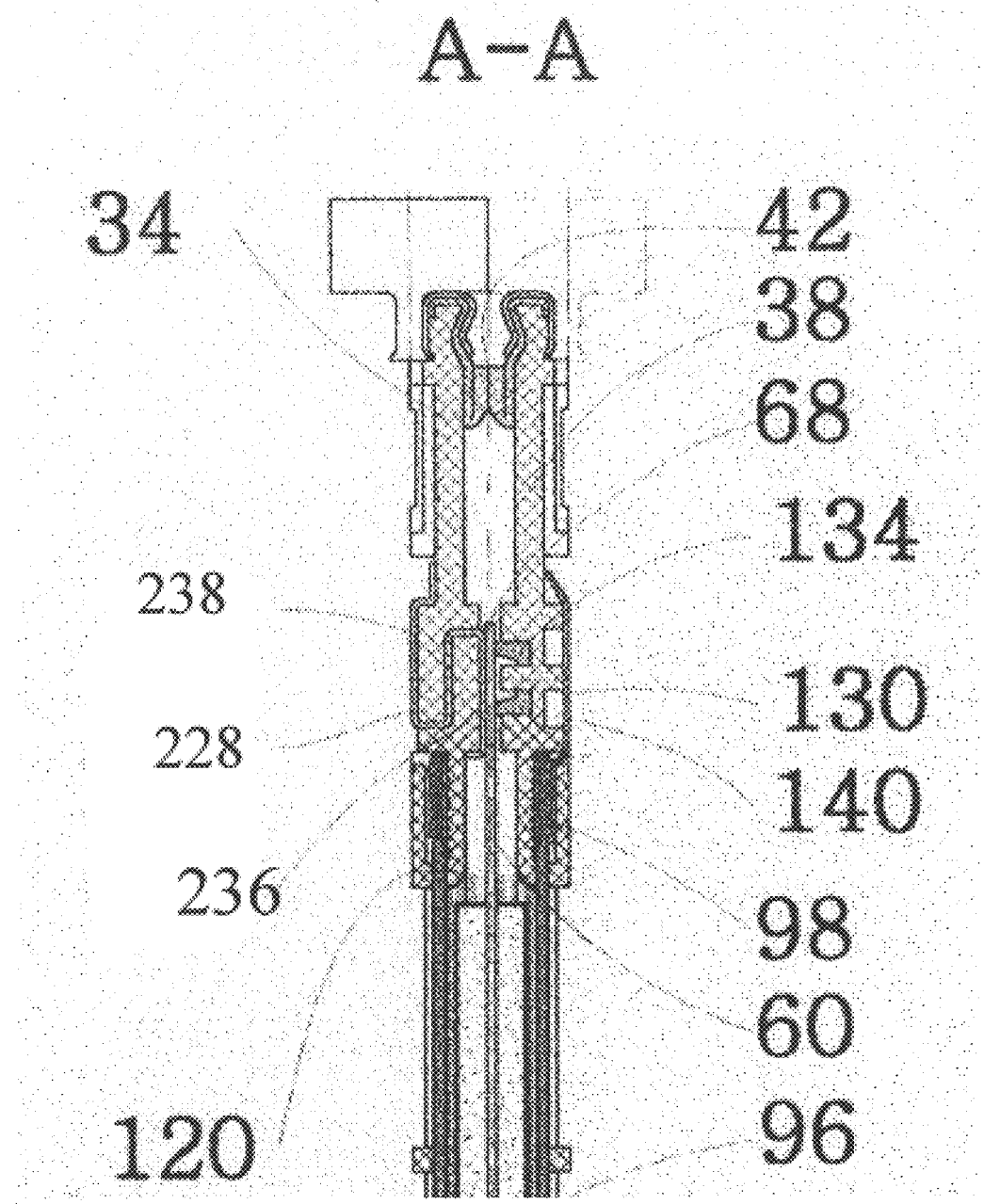
FIG. 29 is a close up view of the top of FIG. 26.
Figure 30:
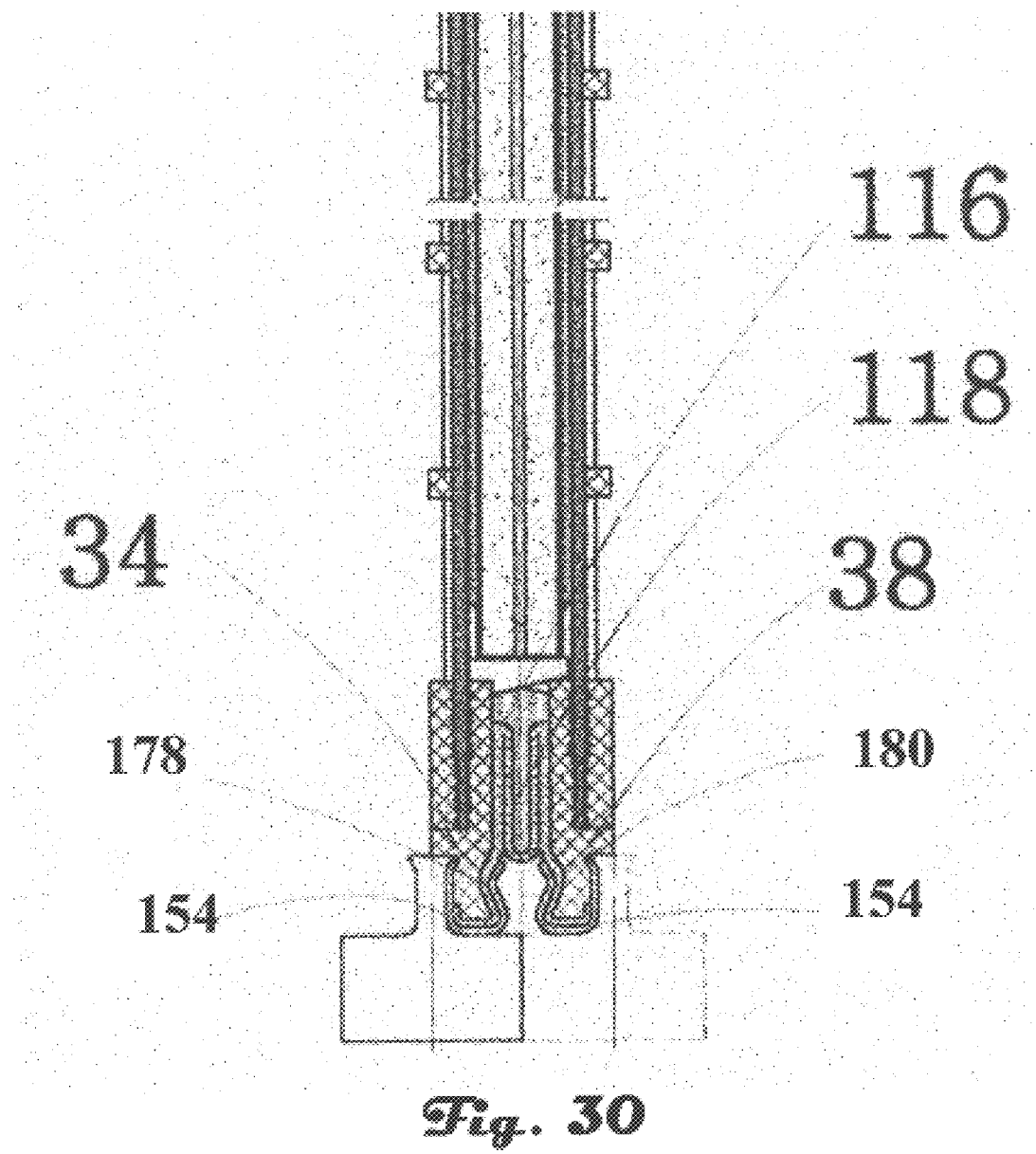
FIG. 30 is a close up view of the bottom of FIG. 26.
Figure 31:
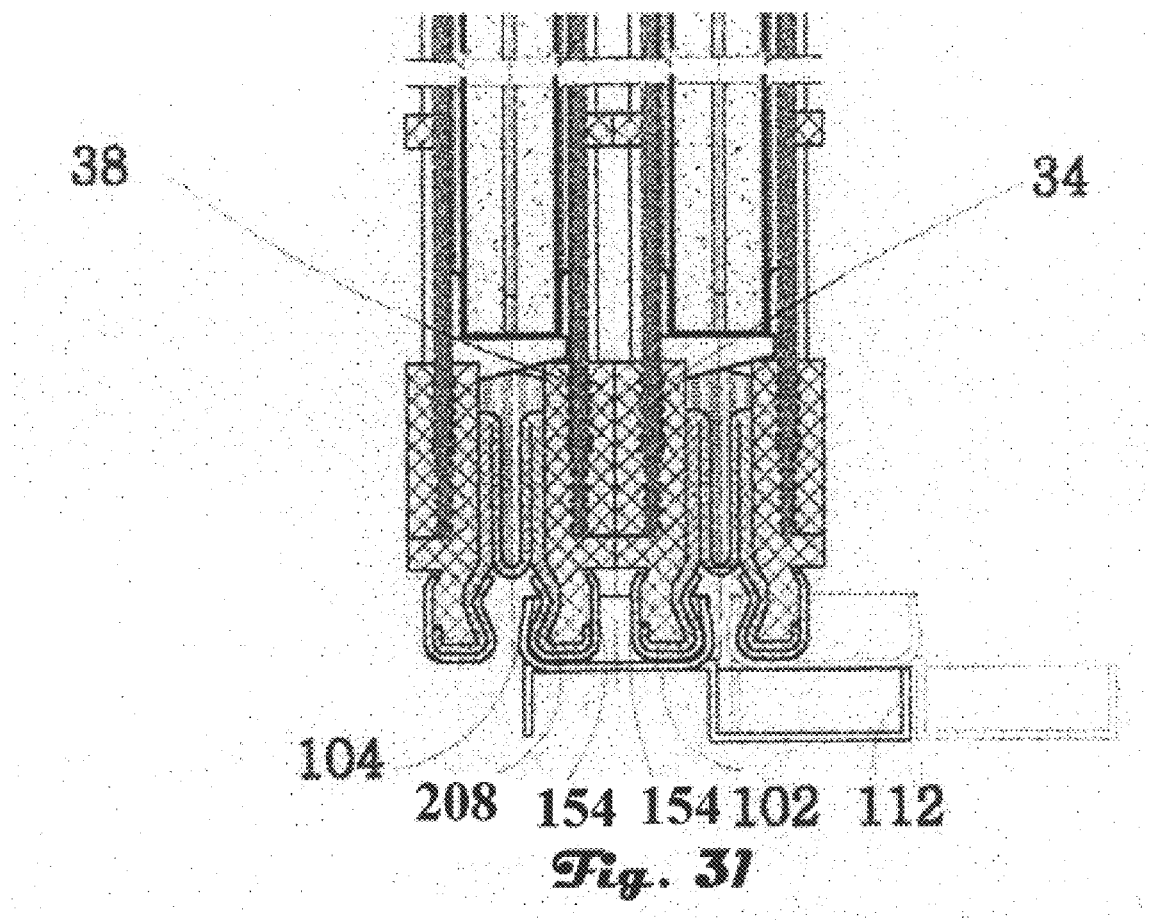
FIG. 31 is a close up view of the bottom of FIG. 23.
Figure 32:
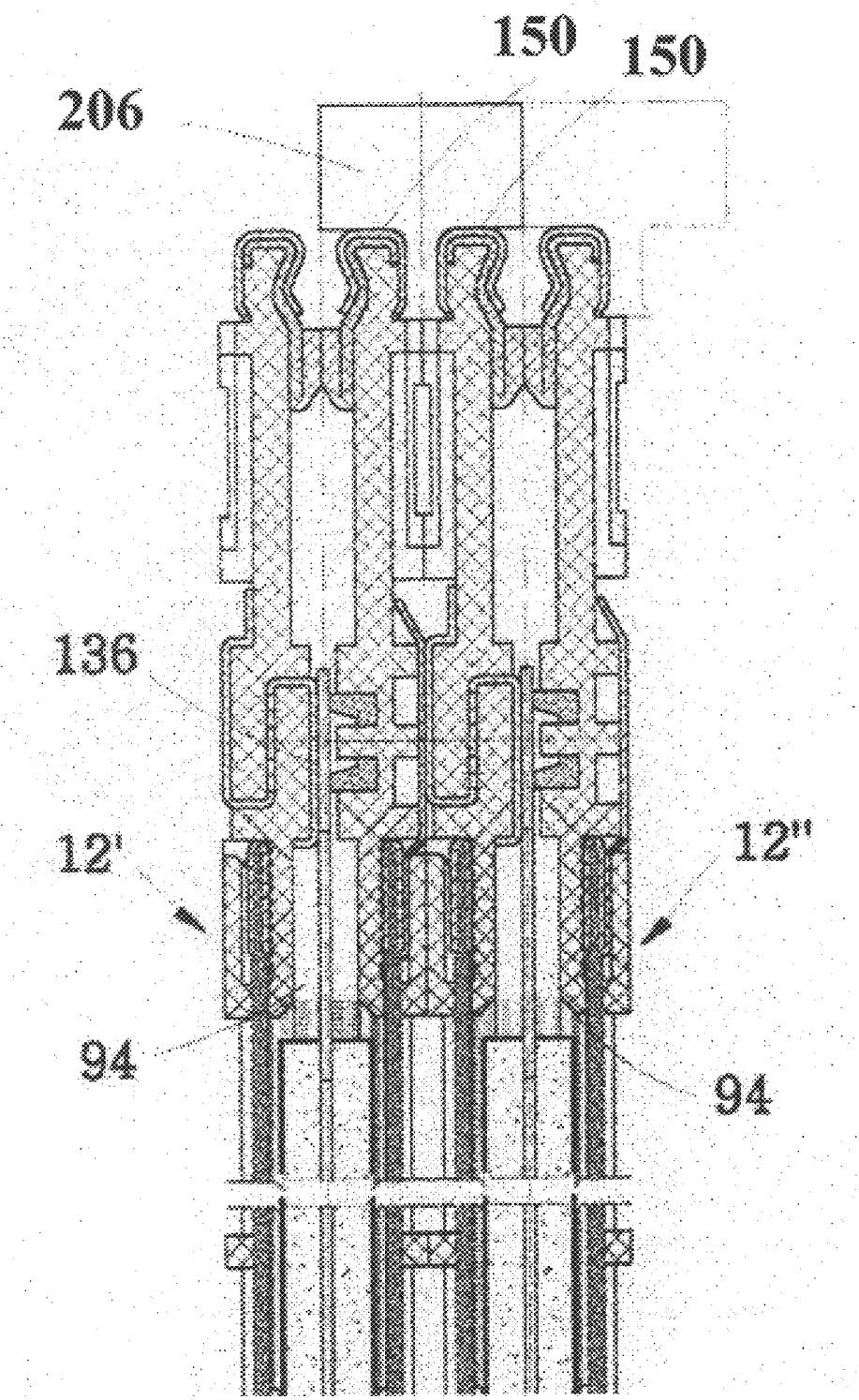
FIG. 32 is a close up view of the top of FIG. 23.

The grooves 178 and 180 on the soft pocket 22 shown in FIG. 20 should be wrapped on the periphery 186 of the first retaining structure 34 and the periphery 188 of the second retaining structure 38. Referring to FIG. 26, FIG. 29, and FIG. 30, the four edges of both grooves 178 and 180 are securely wrapped on the four edges of the periphery 186 and periphery 188 and sealed by tightly pressed the metal-fittings 150, 152, 154 and 156 on the outer surfaces of the grooves 178 and 180.

The further embodiment shown in FIG. 15 differs from the first described embodiment in that the two top edges 90 and 92 are thicker and more elastic than any kind of membrane, increasing reliable sealing. The top edges of the first retaining structure 34 and the second retaining structure 38 are whole flat surfaces, long enough to press against the whole length of the opening 42 of the soft pocket 22 completely. As can be seen from FIG. 18, FIG. 19, and FIG. 20, the soft pocket 22 is a molded integral piece w-shaped in cross section, making it unlikely to leak except through the contacting surfaces between the groove 178 and periphery 186 as well as the contacting surfaces between the groove 180 and periphery 188.

In this embodiment, these contacting surfaces are reliably sealed by mechanical force created by the deformation of the metal-fittings 150, 152, 154 and 156, and do not rely on any kind of glue. Further, as the natural mode of the soft pocket 22 is in opening state, the only compression force happens during operation. The pi-shaped metal-fittings are provided to create not only the contacting forces between electrical contacts 100 of the first gas cathode 18 and second gas cathode 20 and the contacting force of the tab 68 of the anode support structure 64 to the conducting surface 236 of the s-shaped conductor element 228 (shown in FIG. 26 and FIG. 29), but also the tightening force is evenly distributed along the whole length of the opening 42 of the soft pocket 22, so that a more reliable sealing is obtained.

FIG. 22 and FIG. 23, FIG. 31 and FIG. 32, illustrate an exploded view of the assembly of two adjoining battery cells 12. In the embodiment illustrated in FIG. 22, connecting blocks 102 are disposed at the top and the bottom to lock the second retaining structure 38 of a first battery cell 12' to the first retaining structure 34 of a second battery cell 12". As can be seen in FIG. 22 and FIG. 23, FIG. 31 and FIG. 32, the connecting blocks 102 have the pi-shaped slots, and will be pressed to form female swallow-tailed slots 104, these slots 104 are sized and dimensioned to be fitted with the male swallow-tailed tenon 208 formed by the adjoining two metal-fittings 150 on the top of the cells 12' and 12", or metal-fittings 154 at the bottom of the cells 12' and 12".

FIG. 22 further illustrates the construction of a pair of interconnected slide fasteners which provide expansion restrainers 112 to prevent the expansion of each cell 12 beyond the second retaining structure position.

The four spacers 206 are used to provide the correct spacing between the adjoining two cells 12' and 12", so to allow the reactional air flows through the gap 62 between the cells.

Figure 24:
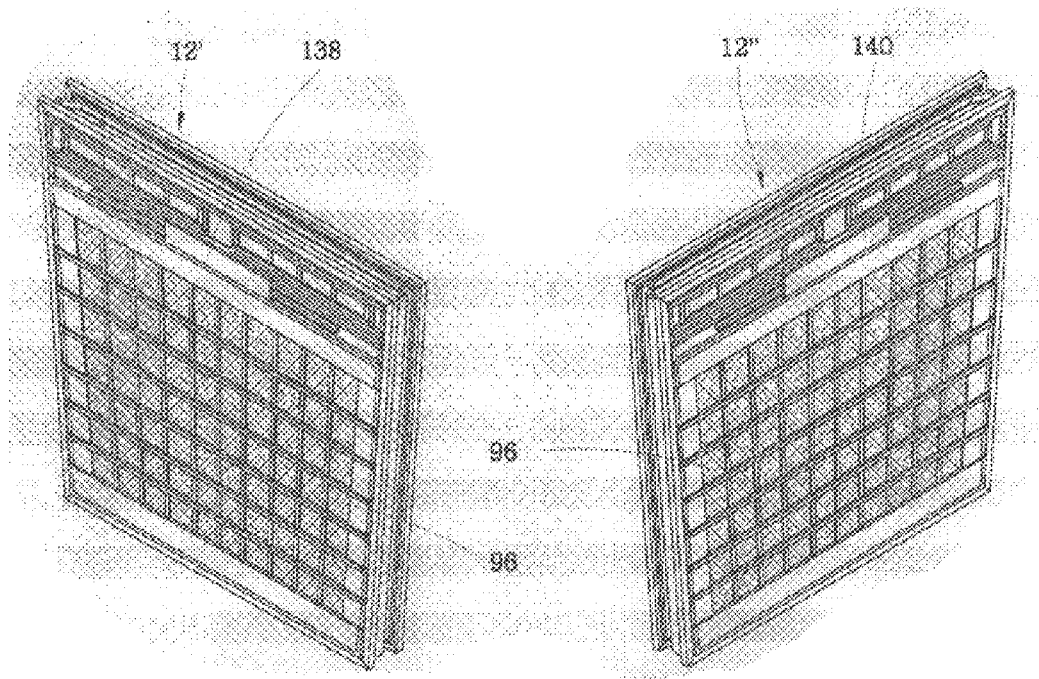
FIG. 24 is a perspective view of the pair of cells shown in FIG. 22.

FIG. 24 illustrates a pair of fully assembled battery cells 12' and 12" which can be disposed adjacent to one another as illustrated in FIGS. 22.

Note that the contacting surface 238 is a part of a S-shaped conductor 228 shown in FIG. 26 and FIG. 29. The other end surface 236 of the conductor 228 is tightly against the tab portion 68 of the anode structure 64. The contacting surface 140 is on the extrusion part gas cathode conductor member 130 of the current collector 98, which is directly wrapped on the top edge of the gas-cathode 20.

There are one contacting surface 238 and one conducting surface 140 on a single battery cell, so that the said battery cells can be connected in series to obtain any desired voltage.

Figure 25:
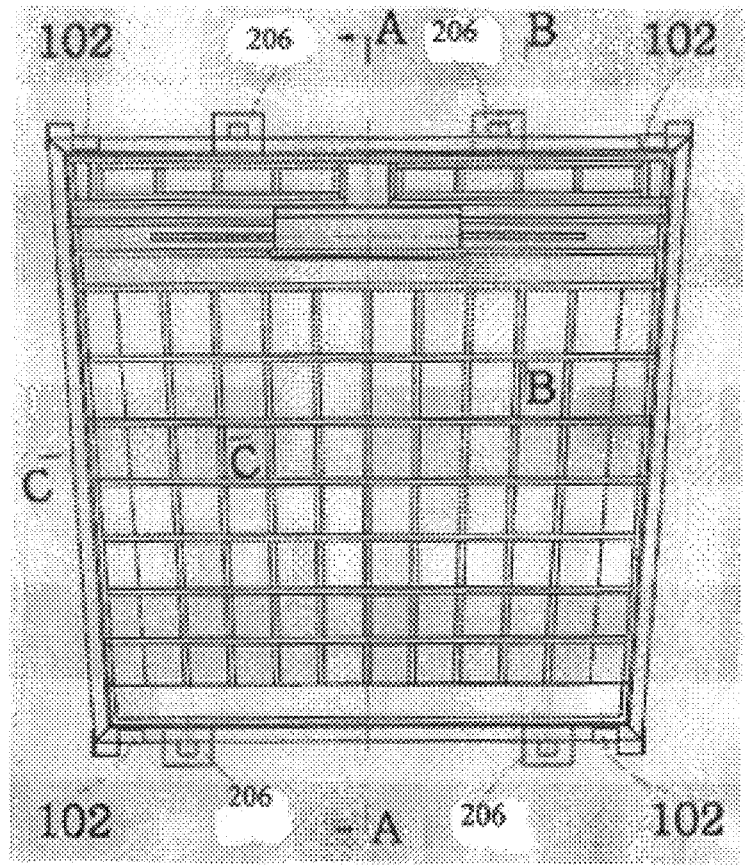
FIG. 25 is a front view of one of the pair of cells shown in FIG. 22.

FIG. 25 illustrates a front view of a typical metal-gas cell 12 useable in the battery 10 of the invention. The shown places of the connecting blocks 102 and spacers 206 are one of the preferred embodiments.

FIG. 28 shows the construction of section C—C taken from FIG. 25, it clearly shows the soft pocket 22 in the operation mode. FIG. 27 shows the construction of section B—B taken from FIG. 25.

Having thus described the invention, it should be apparent that numerous structural modifications and adaptations may be resorted to without departing from the scope and fair meaning of the instant invention as set forth hereinabove and as described herein below by the claims.

What is claimed is:

1. A metal-gas cell storage battery comprising:
   (a) at least one battery cell comprising:
      (i) a first gas cathode disposed within a rigid planar first retaining structure, the first gas cathode being permeable to gases but impermeable to liquids, the first gas cathode allowing the passage of gases into the cell;
      (ii) a second gas cathode disposed within a rigid planar second retaining structure, the second gas cathode being permeable to air but impermeable to liquids, the second gas cathode allowing the passage of gases into the cell, the second retaining structure being moveable with respect to the first retaining structure between a first retaining structure position wherein the first retaining structure is proximate to the second retaining structure and a second retaining structure position wherein the first retaining structure is spaced apart from the second retaining structure, the second gas cathode being electrically connected to the first gas cathode;
      (iii) a soft pocket disposed between the first gas cathode and the second gas cathode, the soft pocket having a flexible and planar first wall and a flexible and planar second wall, the first wall having a periphery and a central opening, the periphery of the first wall including a top edge, the second wall having a periphery and a central opening, the periphery of the second wall including a top edge, the periphery of the first wall being connected to the periphery of the second wall except along the respective top edges, the periphery of the first wall being attached to the first retaining structure and the periphery of the second wall being attached to the second retaining structure, whereby the first retaining structure, the first gas cathode, the first wall, the second wall, the second retaining structure and the second gas cathode cooperate to define a liquid retaining soft pocket chamber having a soft pocket lower portion, a soft pocket upper portion and a soft pocket top opening defined between the top edges of the first and second walls, the soft pocket top opening being open in the second retaining structure position and tightly closed in the first retaining structure position;
      (iv) a soft pocket closing mechanism for securing the first and second retaining structures in the first retaining structure position; and
      (v) a metallic anode disposed within the soft pocket chamber;
   (b) a positive first battery terminal electrically connected to the two gas cathodes; and
   (c) a negative second battery terminal electrically connected to the metallic anode.

2. The metal-gas cell storage battery of claim 1 wherein the battery cell further comprises an electrolyte disposed within the soft pocket chamber.

3. The metal-gas cell storage battery of claim 2 wherein the electrolyte is an aqueous solution containing a compound chosen from the group of compounds consisting of potassium hydroxide, sodium hydroxide and sodium chloride.

4. The metal-gas cell storage battery of claim 2 wherein the electrolyte is an aqueous solution containing potassium hydroxide.

5. The metal-gas cell storage battery of claim 1 wherein a semi-permeable membrane is disposed in the soft pocket upper portion to allow gases to flow out of the soft pocket upper portion, the semi-permeable membrane being permeable to gases but being impermeable to liquids.

6. The metal-gas cell storage battery of claim 5 wherein the semi-permeable membrane is made of PTFE.

7. The metal-gas cell storage battery of claim 1 wherein the soft pocket closing mechanism comprises at least one strap.

8. The metal-gas cell storage battery of claim 1 wherein the soft pocket closing mechanism comprises a plurality of straps.

9. The metal-gas cell storage battery of claim 1 wherein the soft pocket closing mechanism comprises one or more than one bolt and one or more than one nut.

10. The metal-gas cell storage battery of claim 1 wherein the top opening comprises expansion restrainers to limit the expansion of the top opening of the soft pocket beyond the first retaining structure position.

11. The metal-gas cell storage battery of claim 1 wherein the metallic anode comprises a planar anode base portion and a tab portion.

12. The metal-gas cell storage battery of claim 11 wherein the anode base portion is disposed within an enclosure bag.

13. The metal-gas cell storage battery of claim 12 wherein the anode base portion has a lower edge and an upper edge, the lower edge of the anode base portion being shorter in length than the upper edge of the anode base portion.

14. The metal-gas cell storage battery of claim 13 wherein the anode base portion is trapezoidal in shape.

15. The metal-gas cell storage battery of claim 1 wherein the metallic anode comprises an electrically conductive support structure to which is attached a metallic anode material.

16. The metal-gas cell storage battery of claim 15 wherein the metallic anode material is zinc.

17. The metal-gas cell storage battery of claim 1 wherein the first and second gas cathodes are first and second air cathodes, respectively.

18. The metal-gas cell storage battery of claim 1 wherein, when the first and second retaining structures are in the second retaining structure position, the metallic anode is retained firmly within the soft pocket by a resilient retaining member.

19. The metal-gas cell storage battery of claim 18 wherein the resilient retaining member is disposed within the second retaining structure.

20. The metal-gas cell storage battery of claim 1 wherein the at least one battery cell is a plurality of battery cells.

21. The metal-gas cell storage battery of claim 20 wherein the plurality of battery cells are electrically connected in series.

22. The metal-gas cell storage battery of claim 11 wherein the battery comprises a plurality of internal cells sandwiched between a first outermost cell and a second outermost cell, the tab portion of the anode in each internal cell being electrically connected to the gas cathodes of an adjoining cell by a conductor member, the conductor member having a portion which is in abutment with the tab portion of said anode.

23. The metal-gas cell storage battery of claim 1 wherein the soft pocket comprises a molded integral piece w-shaped in cross section.

24. The metal-gas cell storage battery of claim 1 wherein the soft pocket is comprised of a fabric reinforced membrane.

25. The metal-gas cell storage battery of claim 24 wherein the fabric reinforced membrane comprises an alkaline-resistant fabric, and at least one alkaline-resistant coating on the fabric.

26. The metal-gas cell storage battery of claim 25 wherein the alkaline-resistant fabric is selected from the group consisting of vinylon, nylon, polypropylene, polyethylene, ethylene propylene diene monomer, butyl rubber, ethylene-propylene copolymer, and chlorosulfonated polyethylene, and the at least one alkaline-resistant coating comprises at least one material selected from the group consisting of neoprene, polypropylene, polyethylene and PVC.

27. The metal-gas cell storage battery of claim 1, wherein the periphery of the first wall is attached to the first retaining structure and the periphery of the second wall is attached to the second retaining structure, by mechanical force without glue.

28. A zinc-air cell storage battery comprising:
(a) a plurality of internal battery cells sandwiched between a first outermost battery cell and a second outermost battery cell, each battery cell comprising:
  (i) a first gas cathode disposed within a rigid planar first retaining structure, the first gas cathode being permeable to gases but impermeable to liquids, the first gas cathode allowing the passage of gases into the cell;
  (ii) a second gas cathode disposed within a rigid planar second retaining structure, the second gas cathode being permeable to air but impermeable to liquids, the second gas cathode allowing the passage of gases into the cell, the second retaining structure being moveable with respect to the first retaining structure between a first retaining structure position wherein the first retaining structure is proximate to the second retaining structure and a second retaining structure position wherein the first retaining structure is spaced apart from the second retaining structure, the second gas cathode being electrically connected to the first gas cathode;
  (iii) a soft pocket disposed between the first air cathode and the second air cathode, the soft pocket having a flexible and planar first wall and a flexible and planar second wall, the first wall having a periphery and a central opening, the periphery of the first wall including a top edge, the second wall having a periphery and a central opening, the periphery of the second wall including a top edge, the periphery of the first wall being connected to the periphery of the second wall except along the respective top edges, the periphery of the first wall being attached to the first retaining structure and the periphery of the second wall being attached to the second retaining structure, whereby the first retaining structure, the first air cathode, the first wall, the second wall, the second retaining structure and the second air cathode cooperate to define a liquid retaining soft pocket chamber having a soft pocket lower portion, a soft pocket upper portion and a soft pocket top opening defined between the top edges of the first and second walls, the soft pocket top opening being open in the second retaining structure position and tightly closed in the first retaining structure position;
  (iv) a soft pocket closing mechanism for securing the first and second retaining structures in the first retaining structure position;
  (v) a zinc anode wholly disposed within the soft pocket chamber, the zinc anode comprising a planar anode base portion and a tab portion, the anode base portion having a lower edge and an upper edge, the lower edge of the anode base portion being shorter in length than the upper edge of the anode base portion; and
  (vi) a semi-permeable membrane disposed in the soft pocket upper portion to allow gases to flow out of the soft pocket upper portion, the semi-permeable membrane being permeable to gases but being impermeable to liquids;
(b) a positive first battery terminal electrically connected to the two air cathodes of the first outermost battery cell; and
(c) a negative second battery terminal electrically connected to the zinc anode of the second outermost battery cell;
wherein the tab portion of the anode in each internal cell is electrically connected to the air cathodes of an adjoining battery cell by a conductor member, the conductor member having a portion which is in abutment with the tab portion of said anode.

29. The zinc-air cell storage battery of claim 28 wherein each battery cell further comprises an electrolyte disposed within the soft pocket chamber.

30. The zinc-air cell storage battery of claim 29 wherein the electrolyte is an aqueous solution containing a compound chosen from the group of compounds consisting of potassium hydroxide, sodium hydroxide and sodium chloride.

31. The zinc-air cell storage battery of claim 29 wherein the electrolyte is an aqueous solution containing potassium hydroxide.

32. The zinc-air cell storage battery of claim 28 wherein the second semi-permeable membrane in each cell is made of PTFE.

33. The zinc-air cell storage battery of claim 28 wherein the soft pocket closing mechanism in each cell comprises at least one strap.

34. The zinc-air cell storage battery of claim 28 wherein the soft pocket closing mechanism in each cell comprises a plurality of straps.

35. The zinc-air cell storage battery of claim 28 wherein the soft pocket closing mechanism in each cell comprises one or more than one bolt and one or more than one nut.

36. The zinc-air cell storage battery of claim 28 wherein the top opening in each cell comprises expansion restrainers to limit the expansion of the top opening of the soft pocket beyond the first retaining structure position.

37. The zinc-air cell storage battery of claim 28 wherein the anode base in each cell portion is disposed within an enclosure bag.

38. The zinc-air cell storage battery of claim 28 wherein the anode base in each cell portion is trapezoidal in shape.

39. The zinc-air cell storage battery of claim 28 wherein the zinc anode in each cell comprises an electrically conductive support structure to which is attached a zinc anode material.

40. The zinc-air cell storage battery of claim 28 wherein, when the first and second retaining structures in each cell are in the second retaining structure position, the zinc anode is retained firmly within the soft pocket by a resilient retaining member.

41. The zinc-air cell storage battery of claim 40 wherein the resilient retaining member in each cell is disposed within the second retaining structure.

42. The zinc-air cell storage battery of claim 28 wherein the plurality of battery cells are electrically connected in series.

43. The zinc-gas cell storage battery of claim 28 wherein the soft pocket comprises a molded integral piece w-shaped in cross section.

44. The zinc-air cell storage battery of claim 28 wherein the soft pocket comprises a fabric reinforced membrane.

45. The zinc-air cell storage battery of claim 44 wherein the fabric reinforced membrane comprises an alkaline-resistant fabric, and at least one alkaline-resistant coating on the fabric.

46. The zinc-air cell storage battery of claim 45 wherein the alkaline-resistant fabric is selected from the group consisting of vinylon, nylon, polypropylene, polyethylene, ethylene propylene diene monomer, butyl rubber, ethylene-propylene copolymer, and chlorosulfonated polyethylene, and the at least one alkaline-resistant coating comprises at least one material selected from the group consisting of neoprene, polypropylene, polyethylene and PVC.

47. The zinc-air cell storage battery of claim 28, wherein the periphery of the first wall is attached to the first retaining structure and the periphery of the second wall is attached to the second retaining structure, by mechanical force without glue.

\* \* \* \* \*